(12) United States Patent
Nemec

(10) Patent No.: US 6,320,273 B1
(45) Date of Patent: Nov. 20, 2001

(54) LARGE VERTICAL-AXIS VARIABLE-PITCH WIND TURBINE

(76) Inventor: Otilio Nemec, Rudeška cesta 89, Zagreb 10000 Croatia (HR)

( * ) Notice: Subject to any disclaimer, the term of this patent is extended or adjusted under 35 U.S.C. 154(b) by 0 days.

(21) Appl. No.: 09/503,214

(22) Filed: Feb. 12, 2000

(51) Int. Cl.[7] .................................. F03D 9/00; H02P 9/04
(52) U.S. Cl. ............................ 290/55; 290/44; 290/43; 290/53; 290/54
(58) Field of Search ................................ 290/43, 44, 53, 290/54, 55

(56) References Cited

U.S. PATENT DOCUMENTS

| | | | |
|---|---|---|---|
| 4,435,646 | * | 3/1984 | Coleman et al. ............... 290/44 |
| 4,449,053 | * | 5/1984 | Kutcher ........................... 290/44 |
| 4,450,364 | * | 5/1984 | Benoit ............................. 290/55 |
| 4,636,707 | * | 1/1987 | Law ................................. 322/35 |
| 5,315,159 | * | 5/1994 | Gribman .......................... 290/55 |
| 5,709,419 | * | 1/1998 | Roskey ............................ 290/55 |
| 6,081,043 | * | 6/2000 | Akesolo ........................... 290/55 |

\* cited by examiner

Primary Examiner—Elvin Enad

(57) ABSTRACT

Several improvements are invented upon a known and well tested selfstarting vertical-axis wind turbine, for economically competitive power production by driving large grid-connected AC generators. It comprises:
  variable blade pitch-angle from 0 to 60 degrees, following variable wind speed for maximum efficiency and to keep constant turbine speed,
  variable blade camber limited to optimal lift-to-drag ratio, controled by pitch and cyclical variation of incidence-angle;
  improved airfoil shape of cambered blades;
  low cost automatic gear-train for two constant turbine speeds;
  protection against overload and prevention of power surge during wind gusts;
  low stress three-legged high tower assembled with nacelle and tail structure on ground level and erected by assembling segments of third leg one section at a time, and reducing costs of concrete footing, tower structure and, hoisting and assembling at ground level, enables a tower to be built to any height required to harness maximum wind energy.

10 Claims, 8 Drawing Sheets

Figure 2:
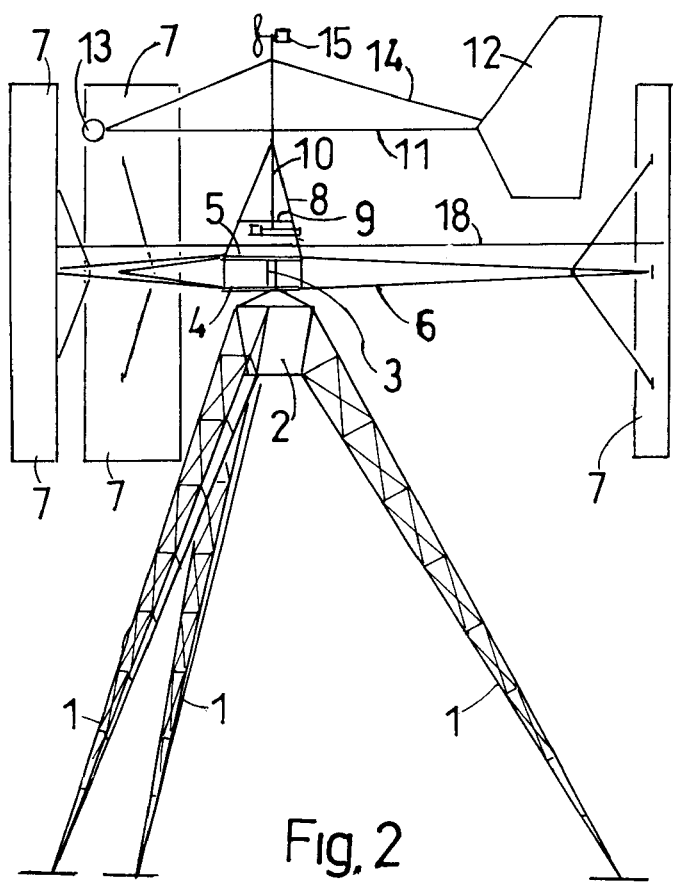

Prior Art — Cyclogyro
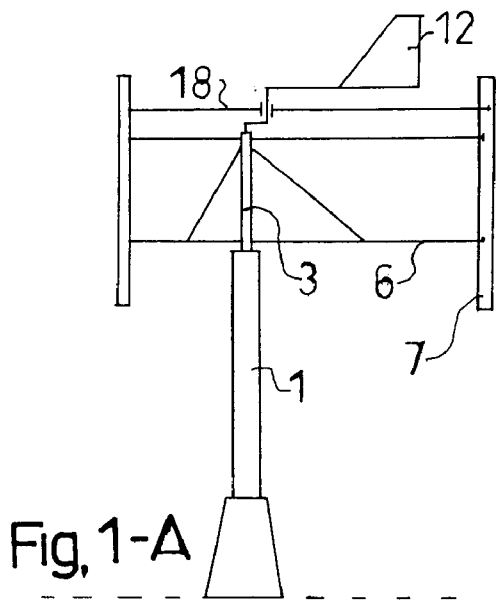
Fig. 1-A
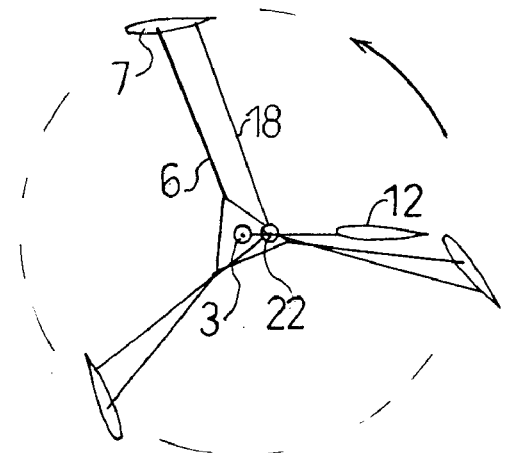
Fig. 1-B
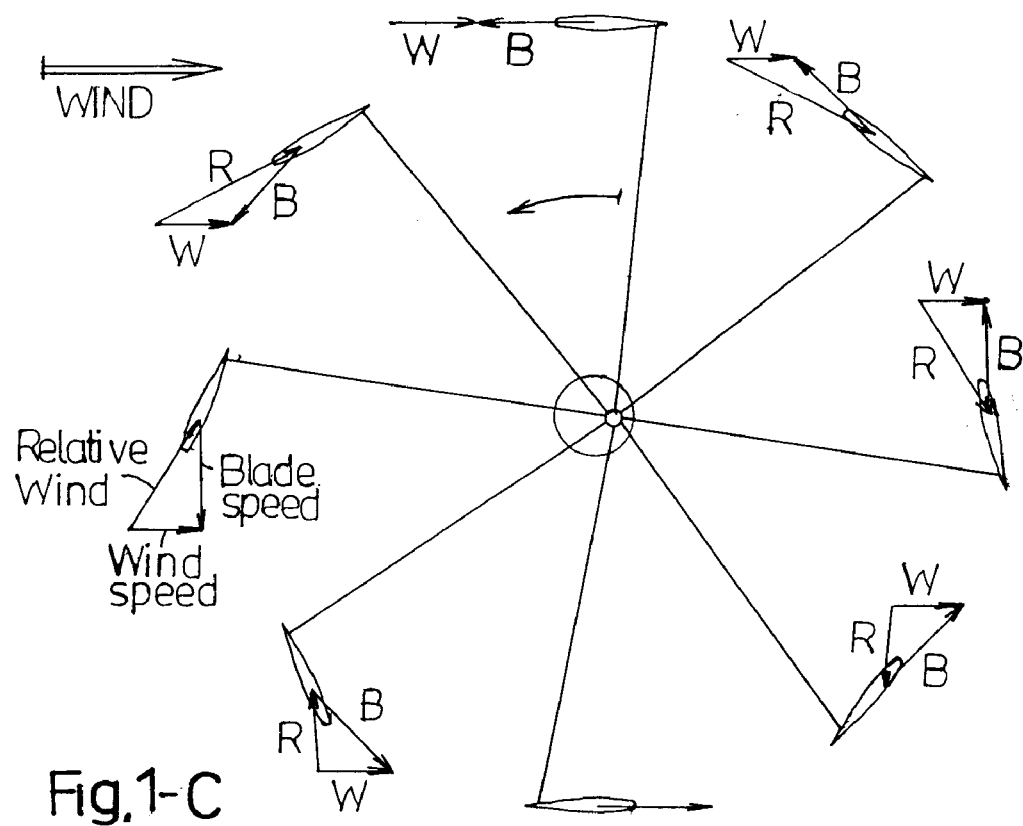
Fig. 1-C

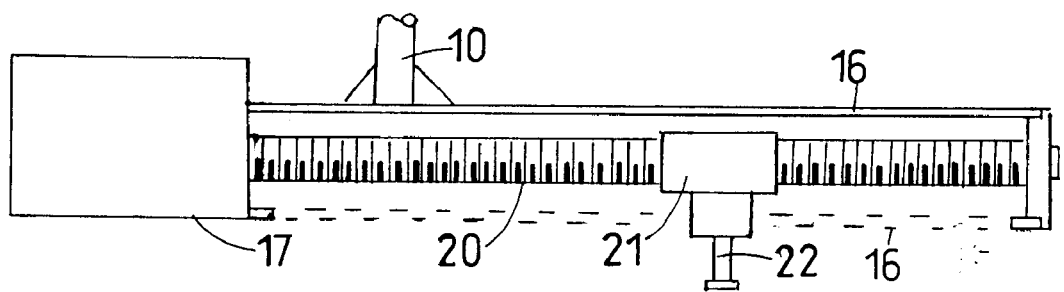
Fig 6
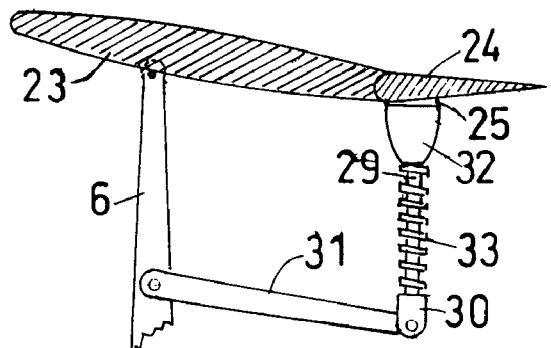
Fig. 7-A
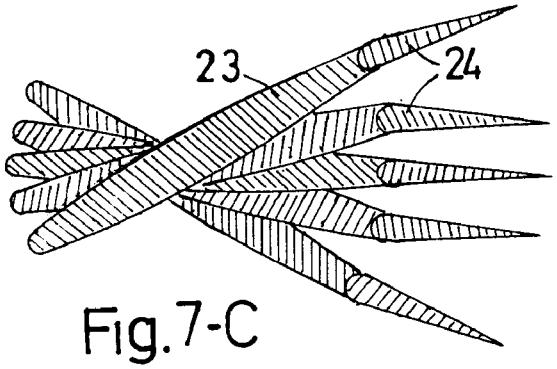
Fig. 7-C
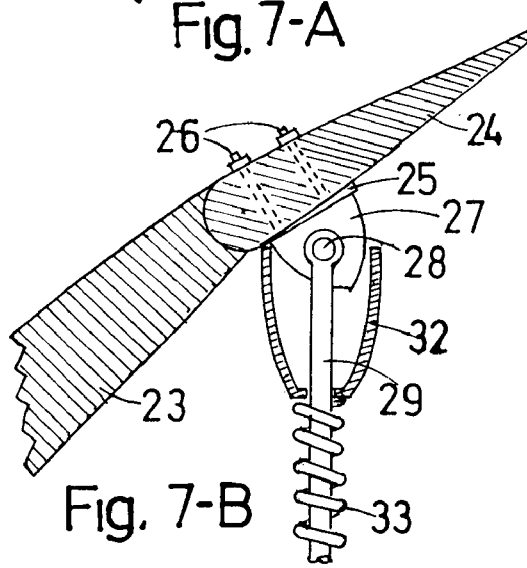
Fig. 7-B
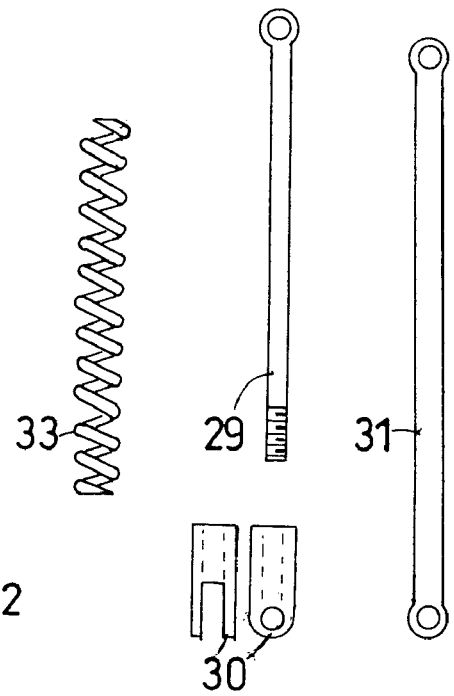
Fig. 8

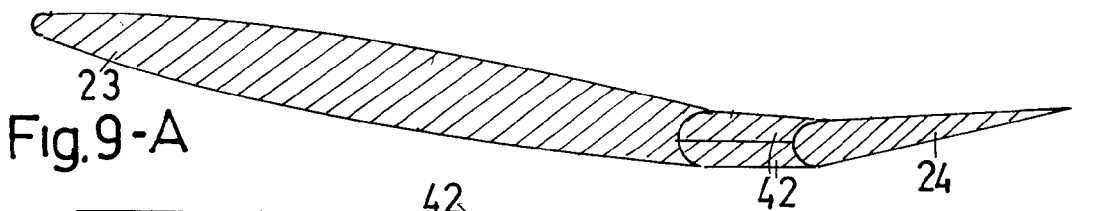
Fig. 9-A
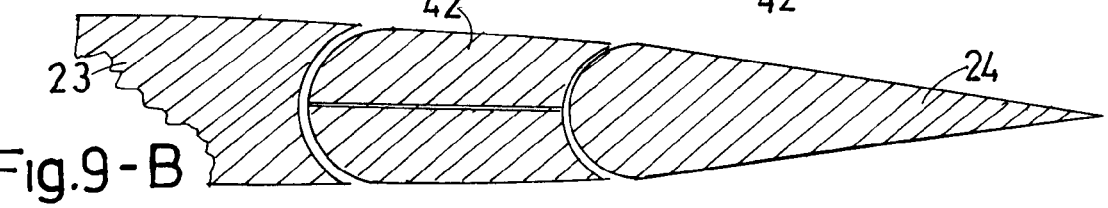
Fig. 9-B
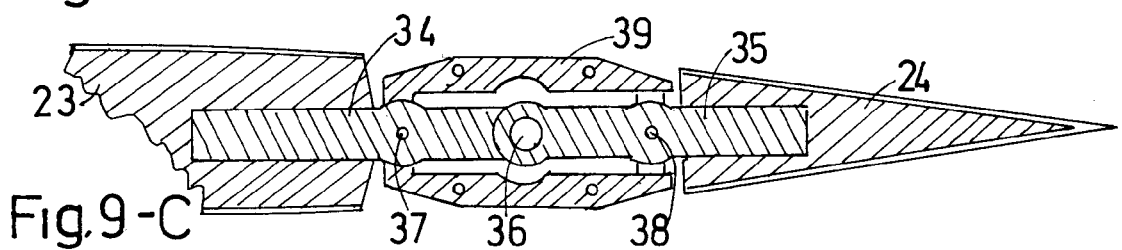
Fig. 9-C
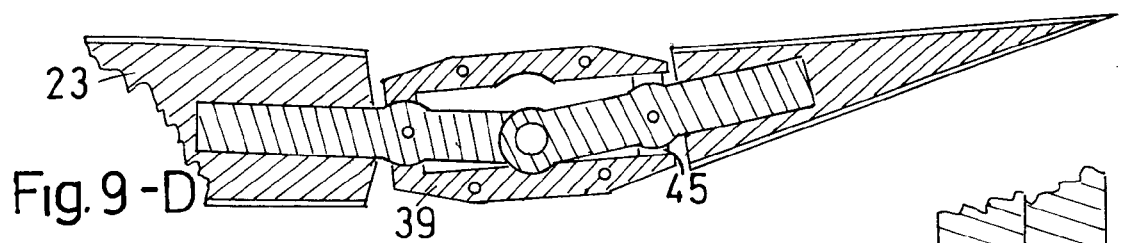
Fig. 9-D
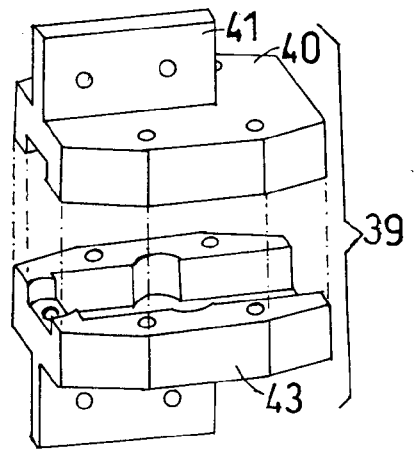
Fig. 10-A
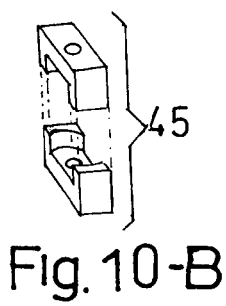
Fig. 10-B
Fig. 10-C
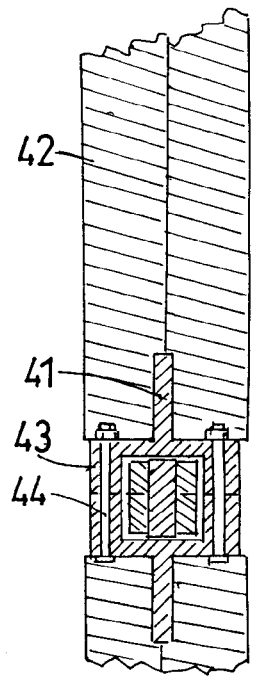
Fig. 10-D

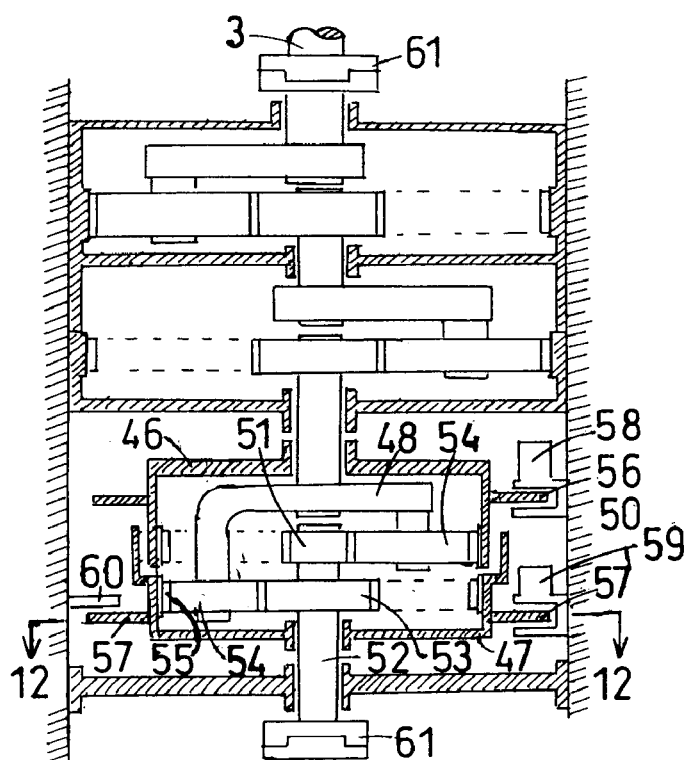
Fig. 11-A
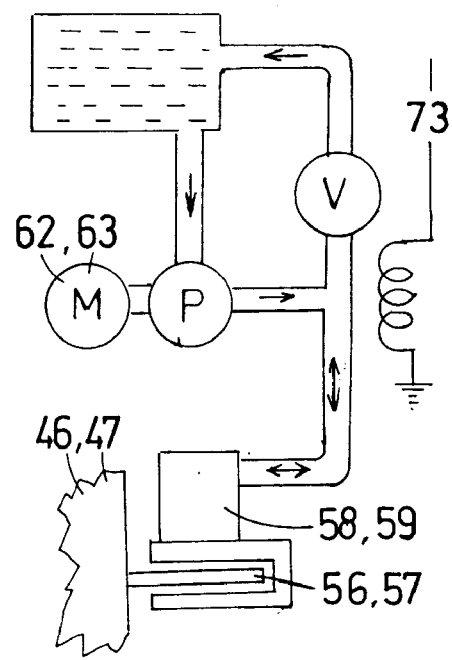
Fig. 13
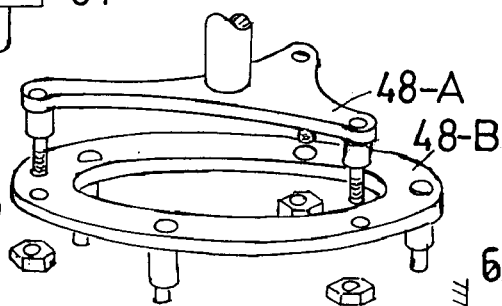
Fig. 11-B
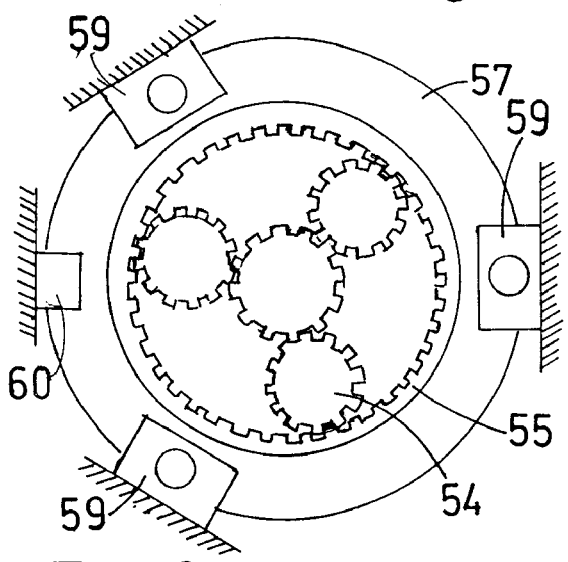
Fig. 12
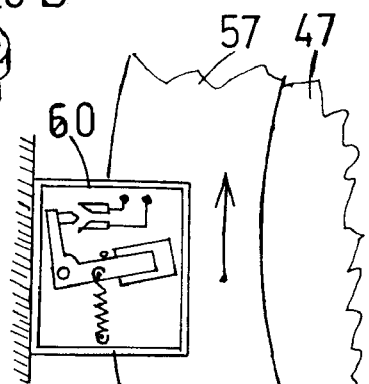
Fig. 14-A
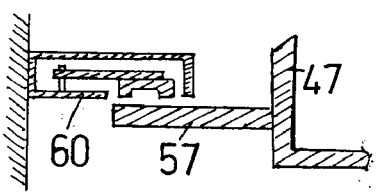
Fig. 14-B

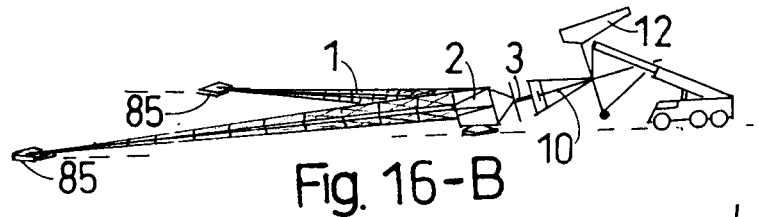
Fig. 16-A
Fig. 16-B
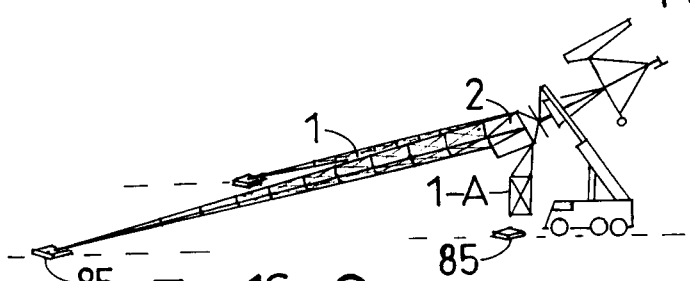
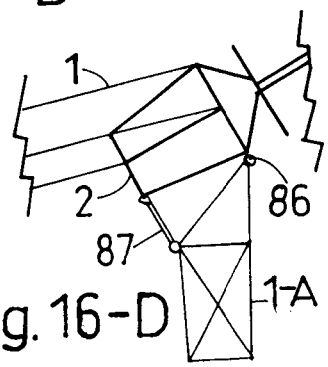
Fig. 16-C
Fig. 16-D
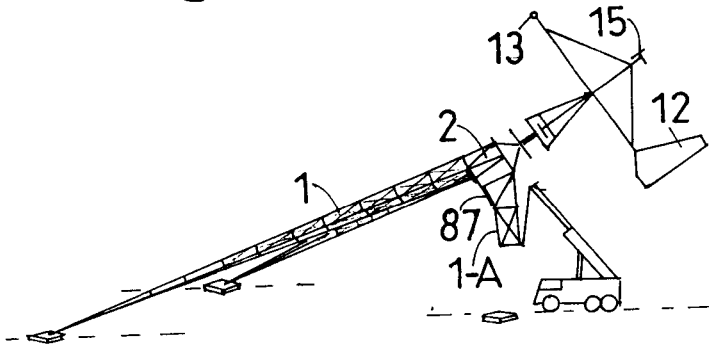
Fig. 16-E
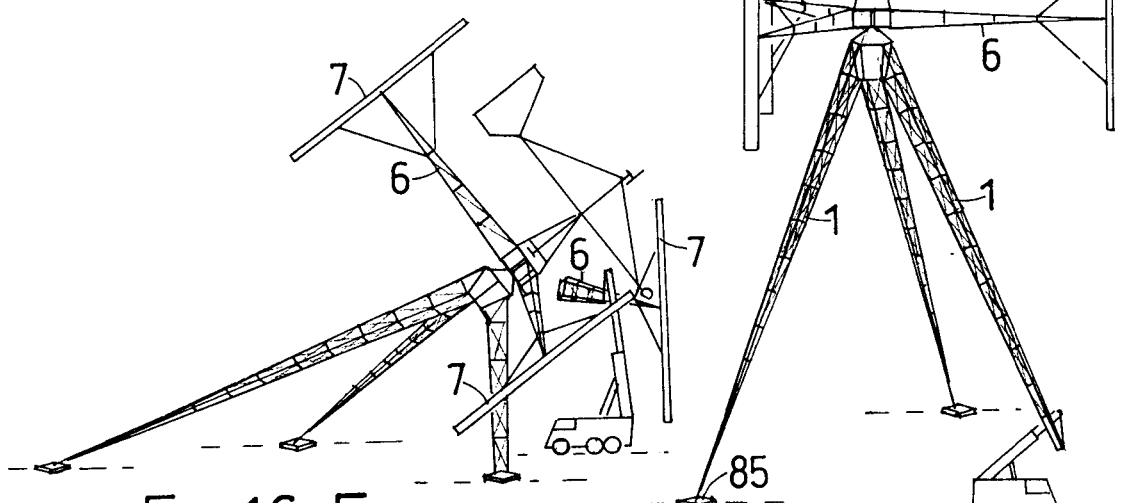
Fig. 16-F
Fig 16-G

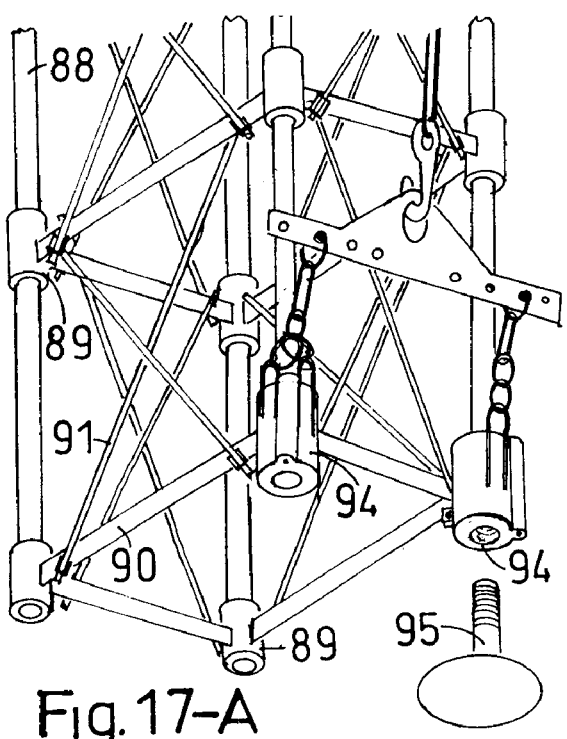
Fig. 17-A
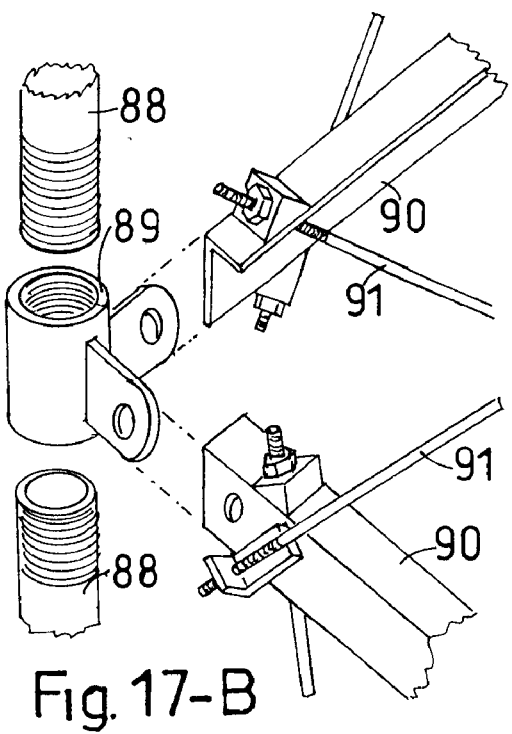
Fig. 17-B
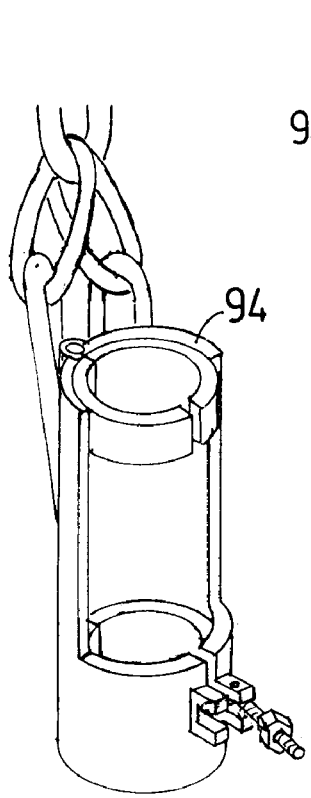
Fig. 17-C
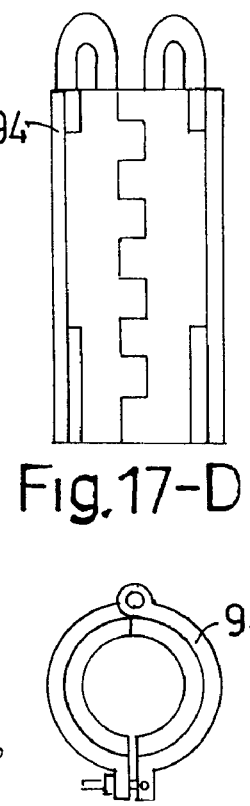
Fig. 17-D
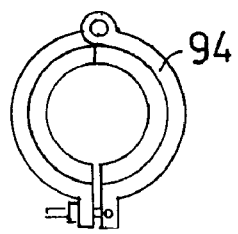
Fig. 17-E
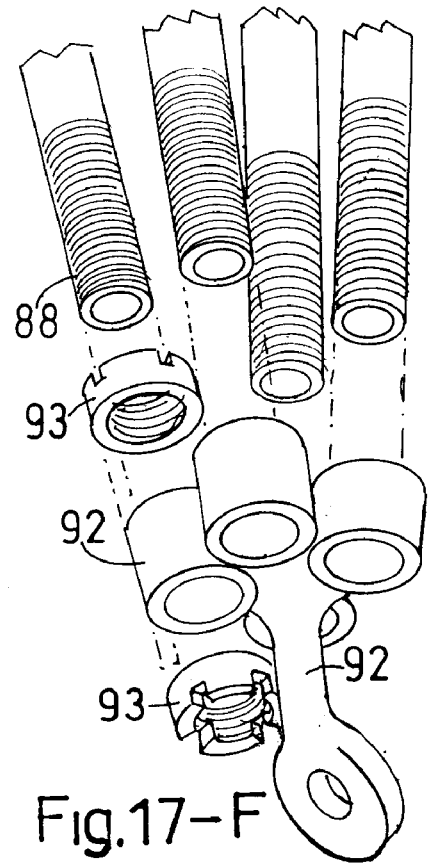
Fig. 17-F

LARGE VERTICAL-AXIS VARIABLE-PITCH WIND TURBINE

BACKGROUND OF THE INVENTION

1. Field of the Invention

The present invention relates to a large wind turbine intended primarily to generate electricity for power plants. The purpose of the invention is to achieve the best possible benefit-to-cost ratio.

2. Prior art

This invention presents a new design and several essential improvements upon a known and tested type of vertical-axis wind turbine called cyclogyro or gyromill, as it is described in the book "Wind Power Plants—Theory And Design" by Desire Le Gourieres, Pergamon Press 1982, pages 143, 144, 177, 194 and 195. Cyclogyro is generally characterized by a vertical shaft carrying two sets of radially from the shaft connected horizontal struts, as cantilevers, one set above the other, straight vertically positioned blades which are pivotally attached each to a pair of said struts. It also has a tail or vane attached to a vertical axle, which axle is mounted in bearings on top of said turbine shaft by a short horizontal arm, so that said axle is positioned eccentrically to the turbine shaft, with steering rods to eccentric axle link following blades. Because said axle is carrying a vane which is always turned by the wind to lee side, trailing portion of each blade is pulled downwind positioning the blades pitch-angle in to the wind, which allowes this vertical-axis wind turbine to be self-starting and more efficient. By rotation of the turbine, the pitch-angle of each blade is cyclically changed from its maximum when speeds of the blade and of the wind are mutually perpendicular, to zero when those speeds are mutually parallel. Because of said cyclical changing of pitch-angle of each blade with each revolution of the rotor, this turbine is called cyclogyro. Cyclogyros however have some disadvantages common to verticals; blades have symmetric airfoils which are less efficient than asymmetric (cambered) blades used on horizontals, and pitch-angle of blades on cyclogyro is not adjustable to different wind speeds, because the pitch amplitude is determined by said eccentricity which is unchangeable. Besides, construction of such an eccentric axle, with a vane mounted on it, presents a very heavy load on its bearings. It is also exposed to extra wear and tear caused by gusts, as with other wind turbines, while solutions for horizontals, as e.g. "the teetering rotor", are not suitable for cyclogyro. Because of rotation on vertical axis, blades on cyclogyro are exposed to forces of wind on both sides alternatively, causing additional stress. This can be prevented with strut supports, which divide the blade in four shorter and much more durable sections as shown in the present invention. The blades of cyclogyro are also exposed to centrifugal force, but because this force diminish with added distance from center of rotation, however with larger turbines that force is a minor problem and can also be minimized by adding supports to the blades as in the present invention.

Cyclogyro was described in publications including Darrieus turbine, as one of the two most successful types of vertical-axis wind turbines. Presently only Darrieus turbine has remained in further experimentations, because of its low-cost design and simpler to manufacture, however not as efficient as herewith presented cyclogyro design. Through extensive search no cyclogyro wind turbine was found.

There are patented inventions of various vertical-axis wind turbines intended to achieve better efficiency or lower costs. Some are related to the present invention in attempt to solve the same problems in different ways, as in following patents:

In U.S. Pat. No. 5,252,029 to Barnes [November 1993] a way of assembling a turbine on ground level and to erect it by a winch is invented, but it was for another type of turbine, not suitable for a three-legged tower as in the present invention.

In U.S. Pat. No. 4,383,801 to Pryor [May 1983] problem of pitch control is solved by three flanges which are as large as the turbine diameter, at a high cost for construction making this turbine not economically viable.

In U.S. Pat. No. 5,193,978 to Gutierrez [March 1993] blades are pitched directly by relative fluid flow, without any other control, which is a system not comparable with the present invention.

In U.S. Pat. No. 5,663,600 to Baek et al. [September 1997] a gear drive of sun-and-planet type was invented, but without possibility of changing speed ratio as it is possible in the present invention.

In German patent application No. P-3816431.0 [Munich, May 13, 1988] inventor disclosed a way to utilize interpolated blade parts mounted on a special joint very similar to grease-box 39 in the pivotal blade-to-aileron link of the present invention. That solution has a significant disadvantage, which is eliminated in my invention. To allow contraction of distance between two secondary pivots on deviated aileron, one secondary pivot is inserted in a slot with straight walls, so that pivot-to-slot contact surfaces were extremely small, causing high stress on those surfaces. That causes rapid wear in connecting parts, creating excessive vibrations which adds to increased turbulence instead of smoothing the flow. In the present invention this problem is solved with addind a small insert installed inside the grease-box, assuring contact surfaces to be equal at both secondary pivots.

In this present invention, said grease-box has an additional function: It is limiting aileron deviation-angle for best lift-to-drag ratio, and is designed specifically for those advantages.

During search for prior art there was not found a constant-speed wind turbine with the same or similar system of variable blade pitch and camber control, and there was no improvement of blade airfoil profile as in the present invention, also no wind turbine to be mounted on a three-legged tower.

OBJECTS AND ADVANTAGES

Present invention is intended to correct said disadvantages of vertical-axis wind turbines; to improve the lift-to-drag ratio of applicable blade profiles; to protect the turbine from excessive stress from gusts; to protect the generator from overload, and to lower the costs of concrete ground footing, tower, blades, transmission, and labor costs of assembling. Solutions for those problems and its objects is explained in brief, as follows:

The main advantage of cyclogyro, in this invention, is in its drum-shaped rotor that makes the cyclogyro the most suitable turbine for the present design for low cost high tower, based upon low stress structure and elimination of all assembly on top of the tower.

Because stress in a tower structure is proportional to horizontal thrust of wind at its top, and to its height to width ratio. In a slender tower with size ratio 20:1 stress in the tower structure is twenty times higher than actual wind thrust, and that makes high slender towers to be a costly part of the turbine. Cyclogyro, as a drum-shaped turbine, can be set on a three-legged pyramidal tower with a height-to-width ratio of 1:1 whereby stress is equal to horizontal force on top of it. That enables lower costs not only for the tower structure but as well for its concrete footing.

The three-legged tower construction is chosen also to eliminate costly labor of assembly on top of the tower. The basic conception of this invention is to assemble a nacelle with a generator and all other machinery in it on the ground. The first two legs of the tower structure are attached to nacelle also in horizontal position on the ground. This is erected by adding the third tower leg in segments, one by one segment from top to bottom of the leg, lifting the nacelle for the length of just one segment at a time. In this procedure there is no need for any high crane, and the tower can be built as high as needed.

There are many advantages of having assembly done on ground level instead on top of a high tower. Working on the ground, groups of assemblers can be installing different sections on the same time, and the whole job can be done much faster. Wages and costs for insurance are lower for work on the ground than if work is performed on top of a high tower. There is no need for any high crane.

The system of building the tower on the ground and erecting it by hoisting the assembled portion step by step, each time only for the height of one segment of the third leg, make it possible to build really very high towers. The advantage of higher towers is obvious because of higher wind speeds in higher air layers.

Second object of the present invention is to construct a simple and low-cost system for generating constant frequency AC power. That is important for grid-connected power plants, and therefore such wind turbines must be provided either with a costly system of rectifiers and inverters or with a system of variable-pitch control Cyclogyro has the advantage to be much more suitable to be adapted for variable-pitch control. That is accomplished in the present invention by adding a simple device to the previous cyclogyro concept, for changing eccentricity of the steering pivot, and by a new design of that pivot to make space for that device. At the same time the support of the tail-axle was improved, as side effect of that constructional change.

Advantage of this solution is in its low cost and better efficiency. The pitch-angle of blades is set always so that the wind strikes the blade at optimal angle enabling the turbine to run at constant speed and with maximum efficiency at all wind speeds. Secondly, the construction of support for the tail-axle allows larger distance between bearings of said axle, and better distribution of loads, because the upper bearing is loaded axially and the lower bearing only radially, which assures longer life of those bearings.

In comparison, Megawatt range horizontal-axis turbines with variable pitch also running constant speed, cyclogyros advantage is in keeping the best lift-to-drag ratio of blades to be uniform within all surface of blades. It provides maximum efficiency at all wind speeds, which is not possible by blades of horizontal-axis wind turbines, straight and even blades of cyclogyro, supported at three points by strut branches, are much more resistant to distortions; they are lighter and much easier to manufacture than tapered blades supported only by the hub, on horizontal-axis wind turbines.

The third object of the present invention is to improve efficiency of the blade profile. Because by vertical-axis wind turbines the wind strikes the blade alternatively from either side, most verticals have blades with symmetric profiles, which are less efficient than cambered blades. This disadvantage is herewith solved by utilizing previously presented mechanism of cyclogyro for cyclical change of pitch-angle on each turn of the rotor, and by adding a new type joint for an aileron. Therefore, the aileron is turned cyclically always to the wind stricken side of the blade, making the blade-and-aileron composite to be cambered and thereby more efficient.

Advantages of this solution are not only use of cambered blade-profile, but also variability of this camber. At higher wind speeds this camber is limited to the highest lift-to-drag ratio of such blade, and by lower wind speeds this camber is reduced by the pitch-angle, to correspond with the actual angle of attack That is an advantage that even large horizontal-axis wind turbines do not have, because camber of their blades cannot change.

Efficiency is also lower due to unevenes of blades with deviated aileron, because of knee-joint of the aileron. This problem is solved by herewith invented joint which includes a grease-box, splitting the angle of deviation in two, and holding an interpolated third blade part between blade main body and the aileron, to cover the knee-joint and to smooth the air flow. Advantage of this improvement assures smoother air flow with less turbulence, and the joint is lubricated for life by the grease-box containing lubricant.

Additional object of the present invention is to provide a simple system by using said automatic pitch-control also to automatically change gears for this turbine, which is running at two constant speeds. This is also advantageous because the turbine can run in the range of favorable blade-to-wind speed ratio in a wide range of wind speeds.

Other advantages of my design are in simplicity of its control mechanism and also in using a low-cost sun-and-planet gear train, which is much smaller and lighter, and does not need costly mechanism for speed synchronization by changing gears. Advantageous is also multiple function of clutches, which are serving for load control and for change of gears as well as for usual functions as clutches and as brakes.

A further important object of the present invention is to provide an efficient and low cost system for protection against excessive stresses caused by gusts, and prevention of overloading the generator. During severe gusts wind speed can be doubled within seconds, and rotation speed of large turbine cannot easily be adjusted for as quickly. Present invention comprises several independent systems to prevent excessive stresses by gusts. First and fastest to react is with a flexible adjustment of aileron deviation, which makes the aileron to bend backwards whenever actual thrust of wind exceeds rated pressure on blades. Secondly, said pitch control is automatically changing pitch-angle of blades to lower the thrust, whenever wind tachometer senses actual change in wind speed. The third system of protection is a special "yielding up" clutch system, which momentarily releases the clutch, allowing the rotor to run faster, and in the same time lowering torque on the generator whenever the automatic pitch control is too slow to follow occasional burst of wind gust The protection against overloading the generator is engaged automatically together with the pitch control, lowering torque on the generator before it is overloaded.

Advantageous of this triple system of protection is simplicity of its mechanical parts and controlling devices, which adds to reliability, lower costs of turbine structure, gained by better protection against excessive stresses, and in the capability to generate power at wide range of wind velocities.

In comparison with large horizontal-axis wind turbines, the advantage is also with more air layers utilized by cyclogyro, and with minor differences in wind speed and turbulence. Large horizontal-axis wind turbines must be either mounted on very high towers or blade tips travel through air layers of different speeds, and must utilize compensating controls which are much more costly.

DRAWING FIGURES

In the drawings, closely related figures have the same number and different alphabetic suffixes.

FIG. 1-A—Prior Art cyclogyro side elevation.

FIG. 1-B—Prior Art cyclogyro, plan view of the rotor.

FIG. 1-C—diagrammatic view of wind-to-blade incidence-angle by a slow running cyclogyro type wind turbine.

FIG. 2—side elevation of the wind turbine of the present invention.

Figure 4:
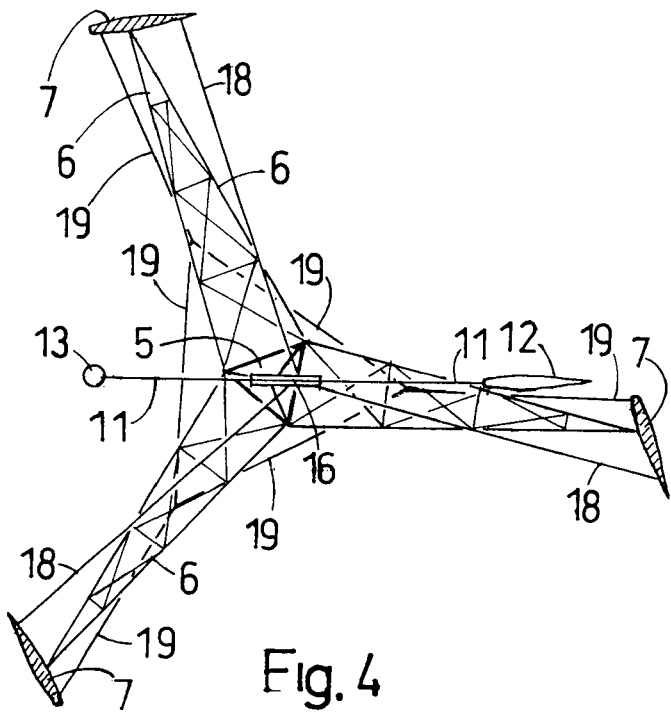

FIG. 4—top plan view of the rotor of the turbine from FIG. 1 without a tower.

Figure 3:
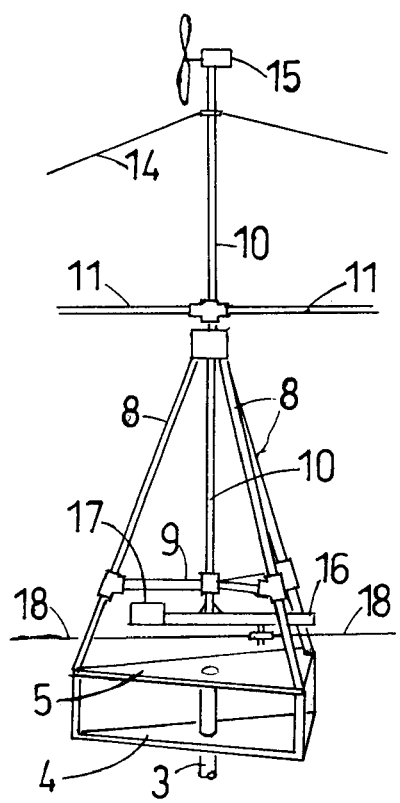

FIG. 3—enlarged fragmentary top perspective of a central portion above the shaft.

Figure 5:
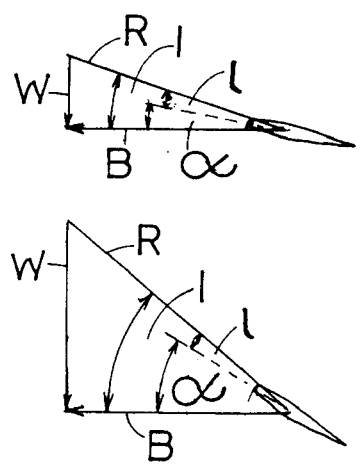

FIG. 5—two diagrammatic views of relation between wind speed and blade pitch-angle for two wind speeds.

FIG. 6—enlarged partly diagrammatic sectional view of a steering mechanism.

FIG. 7-A—diagrammatic view of a blade section with a mechanism for aileron deviation control.

FIG. 7-B—enlarged trailing portion of blade shown in FIG. 7-A at larger pitch angle.

FIG. 7-C—diagrammatic view of blade section at various pitch-angels.

FIG. 8—common view of all parts of the mechanism, shown in FIGS. 7-A and 7-B.

FIG. 9-A—sectional view of a blade profile with an aileron and its joint.

FIG. 9-B—enlarged trailing portion of blade shown in FIG. 9-A.

FIG. 9-C—sectional view of blade trailing portion on the level of the joint.

FIG. 9-D—same as in FIG. 9-C with maximally deviated aileron.

FIGS. 10-A—isometric exploded view of grease-box 39.

FIG. 10-B—isometric explored view of inserted part 45.

FIG. 10-C—sectional view of grease-box 39 along the blade cord.

FIG. 10-D—sectional view of grease-box 39 across the blade cord.

FIG. 11-A—diagrammatic sectional elevation of a sun-and-planet gear train assembly.

FIG. 11-B—perspective view of preferable embodiment of a means for power transfer.

FIG. 12—diagrammatic transverse section of second-speed level of FIG. 11-A gear.

FIG. 13—diagrammatic view of a hydraulic clutch-and-brake system.

FIG. 14-A diagrammatic view of a means for free-wheeling for second-speed gear level.

FIG. 14-B—sectional view of means shown in FIG. 14-A.

Figure 15:
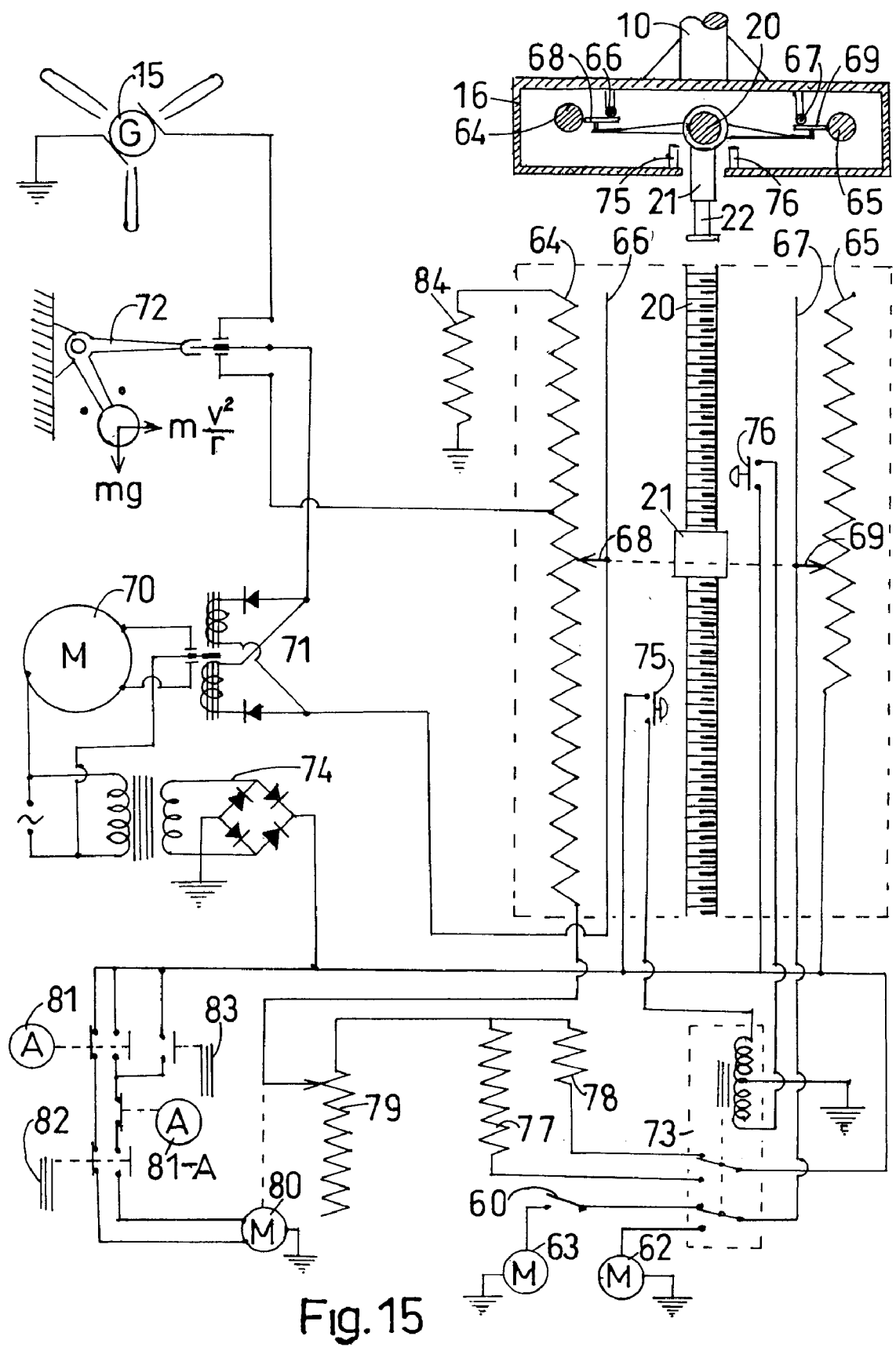

FIG. 15—diagrammatic view of electric wiring of all control systems.

FIG. 16A—assembly of a nacelle and the tail structure.

FIG. 16-B—assembly of first two legs to the nacelle.

FIG. 16-C—assembly of first segment of third leg.

FIG. 16-D—position of joint 86 and adjustable fastening means 87.

FIG. 16-E—change of the crane hook position.

FIG. 16-F—assembly of struts and blades.

FIG. 16-G—assembly of end portion of third leg.

FIGS. 17-A—one segment of tower leg with jaw-hooks.

FIG. 17-B—isometric exploded view of a leg portion.

FIG. 17-C—isometric view of a jaw-hook.

FIG. 17-D—sectional view of a jaw-hook-vertical cut.

FIG. 17-E—sectional view of a jaw-hook-cross cut.

FIG. 17-F—isometric exploded view of leg end portion.

REFERENCE NUMERALS IN DRAWINGS

| | | | |
|---|---|---|---|
| 1 | tower structure, leg members | 1-A | top segment of third leg member |
| 2 | nacelle [means for housing the shaft] | 3 | vertical turbine shaft |
| 4 | hub structure - lower platform | 5 | hub structure - upper platform |
| 6 | horizontal struts | 7 | vertical blades |
| 8 | support means - tilted struts | 9 | support means - radial struts |
| 10 | tail axle | 11 | tail structure - beam |
| 12 | tail structure - vane | 13 | tail structure - counter-weight |
| 14 | tail structure - support cables | 15 | wind tachometer |
| 16 | steering mechanism - case | 17 | motor-and-gear case |
| 18 | connecting means - cables | 19 | reverse-pulling cables |
| 20 | steering mechanism - long male screw | 21 | steering mechanism - screw nut |
| 22 | steering mechanism - steering pivot | 23 | blade main body |
| 24 | aileron | 25 | plate |
| 25–33 - means for deviation control | | | |
| 26 | fastening screws | 27 | short hinge arm |
| 28 | bolt | 29 | long hinge arm |
| 30 | screw-nut with the eye | 31 | distance rod |
| 32 | covering means [cup] | 33 | coil-spring |
| 34 | hinge-arm in blade main body | 35 | hinge-arm in the aileron |
| 34–45 - pivotal link [of the aileron to blade main body] | | | |
| 36 | main pivot | 37 | secondary pivot |
| 38 | secondary pivot | 39 | grease-box - semi-shells |
| 40 | half shell - bottom plate | 41 | half-shell - fin |
| 42 | interpolated blade parts | 43 | half-shell - side walls |
| 44 | half-shell - screws | 45 | inserted part |
| 46 | first-level rotating gear-case | 47 | second-level rotating gear-case |
| 48 | means for power transfer [yoke] | 48-A | upper-level yoke |
| 48-B | lower level yoke | 49 | planet gear |
| 50 | ring gear | 51 | sun gear |
| 52 | gear axle | 53 | second-level sun gear |
| 54 | planet gear | 55 | second-level ring gear |
| 56 | first-level disk | 57 | second-level disk |
| 58 | means to preventing rotation [brake] | 59 | means for preventing rotation |
| 60 | means for free-wheel | 61 | main clutches |
| 62 | first-level oil pump motor | 63 | second-level oil pump motor |
| 64 | pitch-control rheostat | 65 | load-control rheostat |
| 66 | collector wire [pitch control] | 67 | collector wire [load control] |
| 68 | brush | 69 | brush |
| 70 | reversible motor | 71 | differential circuit |
| 72 | centrifugal lever | 73 | double pole double throw switch |

-continued

| 74 | DC power source | 75 | push button |
|---|---|---|---|
| 76 | push button | 77 | longer resistor |
| 78 | shorter resistor | 79 | rheostat for overload protection |
| 80 | reversible motor [overload] | 81 and 81-A | ammeters |
| 82 | first thermostat | 83 | second thermostat |
| 84 | fore-resistor | 85 | anchoring means and footings |
| 86 | means for pivotal linkage | 87 | adjustable fastening means |
| 88 | tower structure - pipe | 89 | tower structure - sleeve |
| 90 | tower structure - traverse | 91 | tower structure - rods |
| 92 | tower structure - pipe junction | 93 | tower structure - screw nuts |
| 94 | jaw-hook | 95 | auxiliary footing |

SUMMARY

This wind turbine presents a new design and several improvements upon a known and tested type of wind turbine called Cyclogyro. Problems of variable pitch and variable camber of blades on a vertical-axis wind turbine are herewith solved by a simple and low cost mechanism enabling smoother flow of the air and higher efficiency.

Its automatic pitch, load, and gear control provides a reliable system for a wind turbine which runs at two constant speeds, and is especially designed for grid connected large AC generators in power plants, without need for synchronization of AC frequency by rectifiers, inverters and voltage adjusters. This turbine is mounted on a low stress three-legged high tower of a new low cost design, which makes it possible to assemble the turbine on ground level and to erect it in sections preassembled, including a third leg. All this will acomplish higher benefit-to-cost ratio and achieve lower cost to generate electric power.

DESCRIPTION OF PREFERRED EMBODIMENT

Before presenting detailed description of this present invention, related features of Prior Art referred to Cyclogyro type of wind turbine are herewith briefly explained with references to FIGS. 1-A, 1-B and 1-C. Drwg. 1/8.

Vertical turbine shaft 3 is carrying horizontal struts 6 with pivotally attached vertical blades 7, which can spin around vertical axis. Trailing portion of each blade is connected by steering rod 18 to an eccentrically to shaft 3 held tail-axle, which is mounted in bearings on top end of shaft 3 and is carrying a tail-beam with vane 12.

Vane 12 is always turned by the wind to lee side, therefore the tail-axle is also on lee side of shaft 3. By each turn of the rotor, the trailing portion of each blade is cyclically pulled and pushed by steering rod 18, so that pitch-angle of blade 7 is cyclically shifted to favorable wind-to-blade incidence angle, as it is shown in FIGS. 1-B and 1-C.

To make it more perceivable, FIG. 1-C is showing a slow-running turbine with blade-to-wind speed ratio only 1.5, although this wind turbine is known as a fast-runner with speed ratio between 3 and 8 for vertical blades. As it is shown, relative wind is striking the blade in all positions at a favorable incidence angle.

Relation between incidence angle and pitch angle of a blade is shown in FIG. 4 for two different wind speeds. As pitch-angle of cyclogyro blade is cyclically changed, pitch-angle α in FIG. 5 is of a blade is in extreeme position when its strut is parallel with the tail-beam and vane 12, because in that particular position pitch-angle is at its maximum. The angle between blade speed direction and direction of relative wind consists of incidence-angle ι and pitch-angle α. When blade speed is constant, which is necessary in case of a directly to grid connected AC generator, and when wind is increasing, then angle between speeds of blade and relative wind is increasing increasing. Thus, because that angle equals i+α, either incidence angle i will widen or pitch-angle α has to be increased.

It is known that a blade has its best lift-to-drag ratio by incidence angles between 4 and 10 degrees, because by smaller angles lift coefficient is too low, and by angles over 10 degrees drag coefficient is rapidly increasing. So to keep incidence angle lower than 10 degrees, when wind speed is increasing the pitch-angle amplitude has to be increased, and to keep it from falling under 4 degrees, when. wind speed is falling the pitch amplitude has to be reduced. That is the reason why some large horizontal-axis wind turbines are provided with variable-pitch system. Cyclogyros of prior art can not vary its pitch-angle amplitude, because it depends upon to unchangeable eccentricity of the tail-axle. This problem is solved in the present invention, as it will be shown in following detailed description.

Variable Pitch

In the preferred embodiment, the rotor of the turbine contains preferably three vertical blades 7 pivotally attached to horizontal struts 6 made of lattice construction, each strut comprising four longitudinal beams. Struts 6 are affixed to a hub structure consisting of two large triangular platforms 4 and 5, which are affixed to shaft 3 and set parallel one above another, whereby each strut 6 is held to the hub in four points, wherein two upper longitudinal strut beams are bound to apices of upper platform 5, and two lower beams are held to apices of lower platform 4, as it is shown in FIG. 2 and FIG. 4.

Those strut beams converge to the point where blade 7 is pivotally hinged to strut 6. The end portion of each strut 6 is forked into three branches to support the blade in three points, as it is shown in FIG. 2. Beams and especially branches of struts 6 are designed to have airfoil shape, to reduce air drag.

Upper hub platform 5 is carrying a support means for tail-axle 10. This support is preferably of a pyramidal structure comprising three tilted struts 8, and three short radial struts 9. Bottom ends of tilted struts 8 are affixed each to one apex on the upper platform 5 of the hub, and their upper ends are held together to a case at upper bearing of tail-axle 10. Three shorter radial struts 9 are linking tilted struts 8 to a case for lower bearing of tail-axle 10 in a horizontal plain a short distance above upper platform 5, as it is shown in FIG. 2 and enlarged in FIG. 3.

Tail-axle 10 is mounted to rotate in its bearings, and is disposed co-axially, with turbine shaft 3. This tail-axle is extended vertically above its upper bearing, where it is carrying a tail structure, comprisaing tail beam 11 with vane 12 on its one end and counterweight 13 on its other end. Support cables 14 are linking vane 12 and counterweight 13 to top portion of tail-axle 10. Wind tachometer 15 is mounted to top end of tail-axle 10. The rotor of this tachometer is preferably a horizontal-axis propeller, which is oriented opposite to vane 12 to be always turned to face the wind.

In the space between upper hub platform 5 and short radial struts 9, steering mechanism in case 16 is affixed to lower end portion of tail-axle 10, comprising a system for cyclical change of blade pitch-angle. In preferable embodiment this system is mechanical It comprises long male screw 20, which is mounted to rotate in bearings set in end walls of case 16, reversible motor 70 with adequate gears enclosed in adjacent case 17 to drive the screw 20, and screw-nut 21 traveling on male screw 20. This screw-nut is provided with downward projected extension carrying steering pivot 22, which is projected out of case 16 through a slot cut in bottom of wall of case 16, as in FIG. 6. Steering pivot 22 is provided with a hub [not labeled, shown only in FIG. 3] on bearings. Steering cables 18, as connecting means, are bound to this hub, linking trailing portion of each blade 7 to steering pivot 22. Reversible motor 70, which drives screw 20, is controlled by an automatic pitch and load control system, which will be described latter.

Screw-nut 21 can not rotate on male screw 20 because of its extension and steering pivot 22, so that it is forced to travel along male screw 20 whenever this screw is rotating. This way, the eccentricity of position of steering pivot 22 in respect to shaft 3 and tail-axle 10 is changed according to rotation of screw 20.

Case 16 with screw 20 is positioned parallel with tail beam 11, so screw-nut 21 travels in direction toward vane 12. When screw-nut 21 stays right over shaft 3 and under tail-axle 10, i.e. co-axial with those two axles, then blades 7 are held at minimum pitch-angle. When screw-nut 21 is driven off this basic position and stairs eccentric to shaft 3, trailing portions of blades 7, which are bound by steering cables 18 to steering pivot 22, are cyclically pulled and pushed on each turn of the rotor, similar to some prior art of cyclogyros. On the side opposite to vane 12, steering cables 18 pull trailing portions of blades. On the side of the vane 12, trailing portions of blades are pulled by centrifugal force. This way, blades 7 are always positioned to certain pitch-angle into the wind. On each turn of the rotor, this pitch-angle is cyclically changed from its minimum, when a blade runs parallel with the wind, to its maximum, when the blade runs perpendicular to the wind, as it is shown in FIG. 1-C.

This maximum of pitch-angle, as amplitude of its cyclical variation, depends on eccentricity of position of steering pivot 22 in respect to shaft 3.

This excentricity can be changed simply by rotation of long male screw 20. Therefore, said amplitude of pitch-angle can be varied in a wide range, which is determined by the length of male screw 20, which depends on size of hub platform 5. It also depends on construction of pivotal joint of blade 7 to strut 6, and on the distance between that joint and the point where cable 18 is linked to trailing portion of blade 7.

In the preferred embodiment, this maximum of pitch-angle amplitude can be extended to 60 degrees, so that by this extreme pitch-angle the blade-to-wind speed ratio will be reduced to only 0.58 [that is cotg. 60 degrees], where wind is 1.7 times faster than the blade. The turbine is provided with an automatic two-speed gear train, to enable the blades to run at two constant speeds, of 22 meters per second in lower, and of 41 meters per second in higher turbine speed. By varying pitch-angle and by changing gears, this wind turbine will run at constant rotor speed at any applicable wind speed. Depending on weight configuration this wind turbine can be built to operate at wind speeds up to 70 meters per second [150 miles per hour]. At times when excessive wind gust exceeds 150 miles per hour, this wind turbine is provided with a system of multiple protections which will be presented in detail.

To be able to restart running after a windless period, the blades must be at a certain pitch-angle whenever the turbine is not turning. In the preferable embodiment steering connections to blades are made of cables. As cables will slacken without wind, this turbine is provided with reverse-pulling cables 19 [shown only in FIG. 4]. This cables are connected to leading portion of each blade, and all three cables 19 are bound together either at a point within the hub, between upper hub platform and cables 18, or in a triangle around the hub structure, as it is shown in FIG. 4.

Variable Camber

A wind turbine with described system of variable pitch-angle can be provided with blades of different types. Blades can be compact, having symmetric profile, or articulate, having two or more parts. In preferable embodiment this wind turbine is provided with compound blades comprising leading and middle portion as a main body 23 and trailing portion as aileron 24, which are pivotally hinged together. When aileron 24 is slightly deviated to one side, this blade turns from a straight one to a cambered blade, and in this position blade is more efficient, having higher lift coefficient and higher lift-to-drag ratio.

By greater deviation-angles of the aileron, drag coefficient becomes higher because of stall-effect, which lowers lift-to-drag ratio and efficiency. Therefore, deviation-angle of aileron 24 must be limited by construction of the joint between aileron 24 and blade main body 23, and this limit of deviation should be chosen so that this blade has the best possible lift-to-drag ratio when aileron 24 is deviated to this limit. In each particular case of construction of such blade, this limit of deviation should be chosen after testing the blade in a wind tunnel, and by comparing polar diagrams made at different deviation-angles. That is because lift-to-drag ratio depends also on other factors, [as relative thickness of the blade and relative length of the aileron cord].

Blades on a vertical-axis wind turbine are stricken by wind alternatively on each side, because wind flows through the turbine and strikes the blade also from inside of the rotor, so the aileron must be deviated alternatively to each side of the blade. This alternation must be performed cyclically on each turn of the rotor. The preferred embodiment of this wind turbine is therefore provided with a herewith invented means for deviation control.

In FIGS. 7 and 8 the preferred embodiment of this means for deviation control is shown in diagrammatic views and in details. It comprises short hinge-arm 27 affixed to plate 25 which is fastened to aileron 24 by screws 26. Bolt 28 is connecting short hinge-arm 27 to long hinge-arm 29 which is oriented parallel to 30 strut 6. This long hinge-arm 29 is provided with screw-nut 30, which has an eye for pivotal connection to distance-rod 31, which is pivotally linked to strut 6. Therefore, distance-rod 31 keeps long hinge-arm 29 to stay parallel to strut 6.

Short hinge-arm 27 is made of two parallel triangular plates affixed to plate 25. The two other borders of plates 27 are curved as segments of circles which have centers in respectively opposite corners, as it is shown in FIG. 7. Plate 25 is larger than plates of arm 27, having margins on both sides, and is wedge-shaped so that its side with plates 27 is parallel to cord of the aileron.

Short hinge-arm 27 with bolt 28 and portion of long hinge-arm 29 is covered by a covering means, which is shown in FIGS. 7 and 8 in form of a cup 32. This cup 32 is shaped to fit over short hinge-arm 27, and is provided with an opening in its bottom wall for passage of long hinge-arm 29.

Long hinge-arm 29 is provided with coil-spring 33 pressed between cup 32 and screw-nut 30 mounted on the end of long hinge-arm 29. This coil-spring presses cup 32 to the margins of plate 25. This spring should be protected by a cover [not shown in figures] having airfoil profile, for protection against snow and ice, and to reduce air drag.

The whole construction of this means for deviation control is shown in FIG. 6-B with a section of blade 7 comprising main body 23 and aileron 24, wherein blade main body 23 is shifted to a pitch-angle that is lower or equal to the limit of aileron deviation. Steering cables 18 and 19, which are responsible for shifting the blade, are not shown, because they are connected to blade 7 at some other level than the branches of strut 6 and this means for deviation control.

In FIG. 7-A cup 32 is pressed by coil-spring 33 over the joint of hinge-arms 27 and 29 to both side margins of plate 25, holding the aileron to its basic position, i.e. parallel to the tangent to its circular path around the rotor. The blade is cambered, with its concave side facing towards the wind, and deviation-angle of the aileron is equal to pitch-angle of the blade main body.

FIG. 7-B shows aileron 24 and the joint covered by cup 32, enlarged, in a position when blade main body is shifted to a very large pitch-angle on lee side of the rotor. In this situation cup 32 is pressed to only one side-margin of plate 25, while the covered joint of hinge-arms 27 and 29, pulled by spring 33, is holding the aileron deviated to its limit of deviation. The blade is cambered with its concave side turned to the wind. [This time the wind is coming from inside of the rotor.]

FIG. 7-C shows a cross-section of the blade in all five characteristic positions. In both extreme positions, where pitch-angle is larger than aileron deviation limit, the aileron stays deviated to its limit In all other positions, when pitch-angle is lower or equal to the limit of deviation, the aileron stays parallel to its basic position, and its deviation is equal to actual pitch-angle of blade main body 23.

Thus, the blade is positively cambered at any pitch-angle of the blade, with camber proportional to pitch-angle by all angles lower than deviation limit, and with limited maximum of camber at all larger pitch-angles.

Each blade is provided with three such means for deviation control, or as many as there are strut-branches.

Pressure of coil-spring 33 must not exceed thrust of wind on aileron 24 at low incidence-angles, so that higher wind thrust, caused by gusts, can turn the aileron backwards against the spring 33. That will turn concave shape of the blade into a straight or even convex one, lowering the lift-coefficient, and that will reduce thrust of gusty wind on blades and on turbine structure.

Another important additional advantage of this system of cyclical cambering of blades can be explained. By cambered blades, zero value of lift coefficient is not at zero pitch-angle but at some negative pitch-angle where trailing portion of the blade stays parallel with the air flow, because in this position air flow is not deflected. By just described system, whenever a blade is inactive at a flank position, running parallel with the wind, its aileron stays parallel with the wind, and thus there is no lift effect regardless to the angle of blade main body which can be slightly pitched to either side. Because of that, all blades on this rotor can be slightly pitched in advance [by shortening of steering cables], so that by increased pitch-angles the blades on front side of the rotor are higher pitched than those on the lee side. That difference in pitch-angle between front and lee side of the rotor is constant and equals double the advanced pitch-angle. This is important for a cyclogyro type of wind turbine, because wind strikes the blade on both sides of the rotor, whereby the wind is slowed down on the front side of the rotor and strikes the lee side with some lower speed. Therefore the blades on this side have to be lower pitched, to keep the incidence angle positive, and to keep wind on the concave side of the blade. Wind energy is used more efficiently when wind to blade incidence angle is larger on lee side of the rotor than on the front side, i.e. when lee side is more efficient than the front side of the rotor. That is because in front of the rotor, wind is partly deflected to all sides from the rotor before striking the blades, and the air flow through the rotor is slowed down, which depends on wind-to-blade incidence angle. On the other side of the rotor, where wind is striking blades from inside of the rotor, the air inside the rotor can not be deflected horizontally to avoid the blades. Therefore, the incidence angle can be larger and the pitch-angle can be lower on lee side of the rotor.

Therefore by controling blades on the front side of the rotor to a larger pitch-angle, efficiency of cyclogyro will be so improved, that power coefficient measured upon the swept area is higher than with other wind turbines. This is because of certain transfer of kinetic energy at the two horizontal planes above and under the cyclogyro rotor, on the boundaries between the slowed down air inside the rotor and the free flowing air outside the rotor. The result of friction and mixture of two air masses is such that inside air is speeded up, taking the kinetic energy from the outer air, which is slowed down. So, cyclogyro is the only type of wind turbine, that can use the energy not only from the wind running through the rotor, but also from the free running wind above and under the rotor.

This gain of wind speed inside the rotor greatly depends on size of the rotor. In preferred embodiment rotor of this turbine will be at least 200 feet in diameter. By wind speed of 15 miles per hour, which is slowed by passing through front side of the rotor to 7 miles per hour or 10 feet per second, the air has 20 seconds to pass the distance between front and lee side of the rotor. Being in frictional contact with outer airflow, wind speed and its kinetic energy can be partly restored on that way before striking the blades again, this time from inside of the rotor.

Consequently, power coefficient of this turbine, when turbine rotor is sufficiently large, will be higher than of any other wind turbine.

Improved Camber

FIG. 9-A is a sectional view of a blade composed of blade main body 23, aileron 24, and interpolated blade parts 42. It shows a cross-section between two pivotal links connecting aileron 24 to blade main body 23, whereby aileron 24 is deviated to its limit of deviation.

FIG. 9-B is cross-section of only trailing portion of the same blade as in FIG. 9-A, when aileron 24 is not deviated.

FIGS. 9-C and 9-D show a cross-section of trailing portion of the same blade, on the level of the pivotal link between blade main body and the aileron. FIG. 9-C shows a straight position of the aileron, and FIG. 9-D its deviated position, where deviation is limited by the construction of grease-box 39.

FIG. 10-A shows grease-bopx 39; FIG. 10-B shows inserted part 45; FIGS. 10-C and 10-D show position of hinge-arms 34,35 and interpolated blade parts 42. Side walls 43 of this semi-shell are shaped to limit rotation of aileron 24 around main pivot 36, which links hinge-arms 34 and 35 affixed in ribs of blade main body 23 and of aileron 24 respectively. Those hinge-arms 34 and 35 are provided each with a secondary pivot 37 and 38, which pivots are positioned equidistant to main pivot 36. Hinge-arms 34 and 35 are dilated in form of circular segments around each one of secondary pivots 37 and 38.

Portion of each half-shell around secondary pivot 37 is provided with boring for this pivot. This portion of each half-shell is shaped to fit around the dilatation of hinge-arm 34, for smooth traction, as shown in FIGS. 7-C and 7-D. Portion of each half-shell around other secondary pivot is provided with straight parallel walls, for sliding contact with inserted part 45.

This inserted part 45 consists of two symmetric halves, each provided with a boring for secondary pivot 38, and with straight and parallel outer walls for sliding contact with inner walls of half-shells, and concave inner walls for sliding contact with the dilatation of hinge-arm 35.

Half-shells are provided with borings in their side walls 43 for fastening screws 44, which are fastening two semi-shells with inserted part 45 around this pivotal link, forming a closed grease-box containing lubricant, as it is shown in FIGS. 10-C and 10-D.

The distance between secondary pivots 37 and 38 is variable, it is shortened when aileron 24 is deviated, causing inserted part 45 to slide inside grease-box 39, whereby this grease-box is rotated on each secondary pivot for a half of deviation-angle of aileron 24.

The shape of inner wails of grease-box 39 and the distance of those walls around main pivot 36, forming free space around this pivot, is limiting the deviation-angle of aileron 24. It has to be designed so as to limit the aileron deviation to extent where the blade with deviated aileron assures best lift to drag ratio.

Bottom wall 40 of each semi-shell is provided with fin 41, which has borings for passage of screws for fastening interpolated blade parts 42. Those parts 42 are inserted between blade main body 23 and aileron 24, between two grease-boxes, as shown in FIGS. 9-A and 9-B and also in FIG. 10-D.

Those interpolated blade parts 42 have to be shaped to follow the outline of the blade-and-aileron airfoil, and to operate at minimum of friction. Since those parts 42 are affixed to grease-boxes 39, they are splitting the aileron deviation-angle in two, to improve the line of blade camber, as it is shown in FIG. 9-A. This will smooth the flow of the air around the blade with deviated aileron, so that air turbulence will be delayed and air drag reduced, improving efficiency of so composed blade.

Two Speed Gear Train

Gear train is an important however costly part of a turbine, and therefore it is herewith a subject for cost reduction. In the preferred embodiment this wind turbine will have rotor of at least 200 feet in diameter. When blades travel at linear speed of 41 meters per second, the rotational speed will be 13 runs per minute. If the grid connected generator runs at 600 RPM, which is 46 times faster than the turbine, then gear ratio must be 1:46. That requires a large gear train.

This turbine is designed to run at constant speed, while the blade-to-wind speed ratio varies depending on wind speed. For better efficiency in using wider range of wind speeds, it is an advantage if the turbine runs at two different but constant speeds, and that requires a two-speed gearbox.

For lower wind speeds, from a breeze to wind of 7 meters per second the blades will run at 22 meters per second, with favorable blade-to-wind speed ratio between 7 and 3, wereby the blades run at least three times faster than the wind. At higher rotor speed, with blade speed of 41 meters per second, this turbine can be made to operate at wind speeds between 6 and 70 meters per second, [13 to 156 miles per hour]. It will work at blade-to-wind speed ratio between 7 and 0.6, whereby the blades will run no more than seven times faster than the wind.

Therefore, this turbine will work as a fast-runner with favorable speed ratio between 3 and 7 [which is equivalent to tip speed ratio between 5 and 10 by horizontal-axis wind turbines], at all wind speeds except at extremely slow and extremely strong winds.

The generator will reach its rated power at wind speed of about 36 miles per-hour. At this speed the torque of the turbine will be automatically limited by a system of pitch and load control, which will be explained latter. Maximum angle can be 60 degrees, as it is already presented, for winds up to 70 meters per second [156 miles per hour], so that this turbine can be built to operate at very wide range of wind velocities.

Vertical-axis wind turbine has an additional advantage because of its vertical shaft, the generator can also be oriented vertically, whereby its bearings are loaded axially, providing longer life and less maintenance. Gear axles should also be oriented/positioned, vertically, and will not require large bevel gears for rotation of vertical turbine shaft and to turn another horizontal gear shaft, and this is additional cost reduction.

Further cost reduction is utilizing a radially oriented sun-and-planet gear system instead of usual gearbox with two parallel axles. The tooth-wheels size ratio is by sun-and-planet gear much better, for speed ratio 1:4 by commonly utilized gearbox, the gear size ratio must also be 1:4, but by sun-and-planet gear of the same gear ratio 1:4 the sun gear and the planet gear are of equal size 1:1, which is less costly to manufacture and minimizes wear. With three planet gears meshed with one sun gear on a sun-and-planet system, actual stress on teeth of those gears is three times lower than by utilizing only two meshed gears. Therefore, the gears of sun-and-planet system can be much smaller and consequently complete gear train can be smaller and less costly.

For changing speed ratio at sun-and-planer gear system there is no need for costly mechanism of speed synchronization, because it operates simply by brakes stopping rotation of ring gear affixed in rotating gear-case at one gear level, and releasing it at the other gear level.

Oil pressure in those brakes can easily be controlled, so that this system can be used for load control, i.e. for protection against overload and stress caused by gusts, which is not possible with other types of gear designs. Also same gears are serving as brakes, as clutches and as speed changing mechanism, and it is herewith further presented in detail FIG. 10 is a sectional elevation of a gear train assembly as a diagrammatic view of the preferred embodiment of the sun-and-planet gear system, consisting of two one-level gear drives having fixed speed ratios, and one two-levels gear drive with variable speed ratio for two turbine speeds. As stated before, the turbine will run at two constant speeds of 22 and 41 meters per second. For higher turbine speed the needed gear speed ratio is 1:46, and for lower turbine speed, the gear speed ratio is 1:86. As the best ratio for gears is 1:1, the first two one-level gear drives mill have sun gear and planet gears of equal size, with gear speed ratio 1:4 each, and that for two drives cumulative gives 4×4=16.

One level of the two-levels gear drive will have smaller sun gear, and therefore higher speed ratio, that is 86 divided by 16 [of first two gear drives] that is 5.37, while speed ratio of the other level will be 46:16=2.88. If ring gears of both levels are of equal size, then also planet gears of second level will be of equal size as the first level sun gear, which is suitable for manufacture.

Construction of first two gear drives, which have fixed gear ratio, is simple. The first axle, coupled to turbine shaft 3, carries a means for power transfer between a central axle and radially disposed parallel journals carrying planet gears In preferred embodiment this means for power transfer is a yoke having three shanks [only one shank is shown]. Each shank is carrying a journal with a planet gear in bearings, as shown in FIG. 10. The three planet gears are meshed with a sun gear affixed to a central axle, and with a ring gear which is formed on an inner surface of a drum-shaped gear case affixed to stationary structure.

The central gear axle, carrying the sun gear of the first gear drive, is extended into a second gear case, where it carries the yoke [as means for power transfer] of the second gear drive which is of the same construction as the first gear drive.

The sun gear of the second gear drive is affixed to second central gear axle, which axle is extended out of the second gear case and into the rotating first level gear case [labeled 46] of the two-level gear drive. This axle carries a two-level means for power transfer i.e. two-level yoke 48 having six shanks, three for each level, [only one shank in each level is shown in FIG. 10]. Each of those shanks includes a journal with a planet gear. Said planet gears are labeled 49 for first level and 54 for second level. The two-level yoke 48- is actually designed as in FIG. 11-B, as upper-level yoke 48-A and lower-level yoke 48-B. Journals of yoke 48-A, carrying planet gears, are extended into bolts holding yoke 48-B with journals for lower-level planet gears.

The upper level planet gears 49 are meshed with sun gear 51 affixed to to central gear axle 52. The three lower level planet gears 54 are meshed with sun gear 53, which is also affixed to the same gear axle 52.

This two-level gear drive has two rotating gear cases, 46 and 47, mounted to rotate on bearings; each on one of said gear axle. Each gear case 46, 47 is provided with a ring gear affixed to inner surface of the case, said ring gears are labeled 50 and 55. Ring gear 50 in upper level case 46 is meshed with three planet gears 49, and ring gear 55 in lower-level case 47 is meshed with three planet gears 54.

Each rotating gear case 46 and 47 is provided with a ring-formed disk, labeled 56 and 57, affixed to outer surface of each case 46 and 47. Each of those disks is connected to set of brakes, as means for preventing rotation, which in preferred embodiment are hydraulic brakes 58 and 59, connected to structure, as it is shown in FIG. 11 in a plan view of lower-level gear drive.

A system of control for those means for preventing rotation, i.e. hydraulic brakes 58 and 59, is shown in FIG. 12. Each set of brakes 58 and 59 is provided with an oil pump motor, labeled 62 and 63, each driving an oil pump provided with a valve controlled by a solenoid powered parallel with respective oil pump motor. This valve stays open when solenoids power is disconnected, and it closes flow of oil proportional to voltage on the solenoid. Therefore, brakes 58 and 59 are supplied with oil pressure proportional to voltage on respective oil pump motor. The oil supply comes from an oil reservoir, which can be shared by both sets of brakes.

Disk 57 of lower gear level, which is designed for second speed i.e. for faster run of the turbine, is additionally provided with a switch controlled by means for freewhiling 60, which is shown in FIGS. 14-A and 14-B. Power supply to oil pump motor 63, is controlled by 60 preventing braking of 59 whenever disk 57 is rotating in reverse direction.

When both pairs of brakes 58 and 59 are released, with no oil pressure, and both disks can run freely, this two-level gear drive is rotating freely, and the generator will not be coupled to the turbine, so they can run independently from each other. In that condition the brakes are acting as a clutch disconnecting the generator.

When both sets of brakes 58 and 59 are under oil pressure, and both disks 56 and 57 are held stationary, then this gear system is locked, because both sun gears are affixed to common gear axle 52, which can not run at two different speeds in the same time. The two sets of brakes acting together are serving as a single brake system preventing rotation of the turbine and of the generator.

When only one set of brakes is under oil pressure, the gear drive where the disk is stopped is actively engaging power to the generator. For changing the speed ratio of the turbine, it is enough to switch the power supply from one pair of brakes to the other. Therefore, the two pairs of brakes are serving as clutch, brake, and a system for changing gear ratio, which changes constant speed of the rotor.

How the automatic change of turbine speed is working will be explained in following description of automatic pitch and load control.

Pitch and Load Control

A system of automatic control of all essential functions is shown in the wiring diagram in FIG. 14.

In steering case 16, containing the system for cyclical change of blade pitch-angle, two rheostats are disposed parallel and along the length of long male screw 20, one of them acting as pitch-control rheostat 64, and the other as load-control rheostat 65. Each of them is provided with a collector wire, labeled 66 and 67, disposed parallel to rheostats 64 and 65, and each with a brush, labeled 68 and 69, which brushes are affixed by insulators to screw-nut 21 traveling on screw 20. Those brushes are connecting each collector wire to its rheostat.

As the brushes 68 and 69 are traveling on nut 21 along screw 20 and along each rheostat 64 and 65, voltages in collector wires are accordingly changed.

Along the path of screw-nut 21, two micro-switches labeled 75 and 76 are positioned, so that they are actuated by passing-by nut 21. Those micro-switches conduct power from DC power source 74, each to one of two counteractive solenoids in a double pole double throw switch 73, which serves for changing gear speed ratios.

One pole of switch 73 distributes power from DC power source 74 over longer resistor 77, or alternatively over shorter resistor 78, and farther over rheostat 79, which serves for protection against overload, to pitch-control rheostat 64 which is grounded by a small resistor 84.

Resistance of each resistor, 77 and 78, has to be decided after comparing diagrams of turbine power output, in dependence on this resistance and wind speed, and accepting the combination which shows the steepest diagram in both turbine speed regions.

Reversible motor 70, which drives long male screw 20 for changing pitch-angle of blades, is powered by a double throw switch controlled by a differential circuit 71 consisting of two counteractive solenoids each coupled with a rectifier and both inter-connected.

One pole of this circuit 71 is connected to a double throw switch controlled by centrifugal lever 72 which connects alternatively either a DC power source from wind tachometer 15 or a point on pitch-control rheostat 64. The other pole of circuit 71 is connected to collector wire 66 of pitch-control rheostat 64.

When the turbine is running, centrifugal lever 72 is moved by centrifugal force and connects power from wind tachometer 15 to one pole of differential circuit 71, supplying it with voltage corresponding to actual wind speed. If voltage coming from collector wire 66 of rheostat 64 to other pole of circuit 71 is higher or lower, this voltage difference will apply current through one of two diodes, and its solenoid in circuit 71, and that will switch motor 70. This motor will drive screw 20 and move screw-nut 21 with brush 68 along rheostat 64 to the point where voltage on this rheostat is equal to that of wind tachometer 15. Therefore pitch-angle of blades will always be adjusted, to correspond with actual wind speed.

Rheostat 64 is grounded by a small resistor 84 to keep starting voltage of rheostat 64 to correspond with voltage from wind tachometer 15 at starting wind speed of about 2.5 meters per second.

When in windless period the turbine is staying still, centrifugal lever 72 is turned by gravitation to connect a point on rheostat 64 corresponding with pitch-angle needed for easy start of the turbine by a breeze. This way, as soon as the turbine stops rotating, motor 70 will drive screw 20 to bring brush 68 to the same point on rheostat 64 where the switch of centrifugal lever 72 is connected, to turn the blades into needed pitch-angle.

When the turbine starts running on a breeze, centrifugal lever 72 will be turned by centrifugal force to connect wind tachometer 15. That will actuate motor 70 to start reducing pitch-angle to correspond with actual wind speed, while the turbine is accelerating to its first turbine speed of 22 meters per second. By any significant change In wind speed, differential circuit 71 will start motor 70 to change pitch-angle of blades to correspond with actual wind speed.

Rheostat 79, which is protecting the generator against overheating, is provided with a small reversible motor 80, for changing its resistance by moving its brush. Motor 80 is controlled by two thermostats and two ammeters.

As any reversible motor, which is working to and from between two end positions, reversible motors 70 and 80 are additionally provided with end-point stop-switches.

Ammeter 81 and thermostat 82 are provided each with a double pole switch acting on two parallel power-lines. In FIG. 14 the right line is for driving motor 80 to increase resistance of rheostat 79, and the left line for driving it back. In the same figure, all switches are shown in normal position when the generator is not overloaded or overheated. When the generator is overloaded, ammeter 81 turns its switch to connect the other line, but nothing will happen until the generator is also heated to its rated temperature and thermostat 82 also turns its switch to the other line. Then motor 80 will drive sliding brush on rheostat 79 to increase its resistance. That will decrease voltage in pitch-control rheostat 64, and it will cause motor 70 to increase pitch-angle of blades. Consequently, incidence-angle and lift-coefficient of blades will be decreased and power of the turbine will be reduced.

When power of the generator is reduced back to its rated limit, ammeter 81 will turn its switch back, and this process will be stopped, with both power-lines open, and resistance of rheostat 79 stays increased until temperature of the generator is also back to normal Thermostat 82 will turn its switch back, and that will actuate motor 80 to drive resistance of rheostat 79 back to its minimum.

If, by any possible cause, temperature of the generator is farther increased although the generator is not overloaded, the second thermostat 83, which is set for some higher temperature, will turn its switch on, so that motor 80 is actuated to continue increasing resistance of rheostat 79. To prevent this process to go too far, the second ammeter 81-A is set to turn its switch off, to break this power-line and to stop farther increasing this resistance when power on the generator is fairly reduced. This will prevent the danger of overdriving the pitch-angle of blades, which could cause negative incidence-angle of blades, and spending power from the grid.

The other pole of switch 73 is distributing power from collector wire 67 of load-control rheostat 65, alternatively to one or to the other oil-pump motor of a set of brakes on the two-level sun-and-planet gear drive. The power-line leading to motor 63 of second speed [higher turbine speed] gear level is provided with a switch, controlled by means for freewheel 60, which is turned off when disk 57 is rotating in reverse direction.

Voltage in collector wire 67 depends upon position of brush 69 and screw-nut 21 along the rheostat 65, which depends upon pitch-angle corresponding to actual wind speed and to actual power of the turbine. As frictional force of hydraulic brakes depends upon oil-pressure, which in this particular system depends upon voltage of power supplied to the oil-pump motor, so the force of brakes is always proportional to actual wind speed and consequently proportional to torque on the gear axle.

This system is designed so that actual force of brakes on each gear level is slightly higher than actual torque of the gear axle. This way, the brakes will hold the disk of the gear drive only if torque is either constant or falling or slowly rising, so that pitch-control system can catch with the change. But, when a gust suddenly strikes the blades, additional stress will not reach the generator, because the gear disk will start sliding as soon as torque surpasses force of brakes, and the turbine will run faster, without changing speed of the generator. For a brief moment, power on the generator will be lower than before, because of lower effect of brakes when sliding, and the surplus of energy will be turned to heat in brakes, but there will be no shocks of power on the generator.

Load-control rheostat 65 is shorter than the length of its collector wire 67, and it covers only the portion where pitch-angles are corresponding to wind speeds lower than the limit where the generator reaches its rated power. From that point to the end of collector wire 67, rheostat 65 is replaced with a straight wire, or a similar conductor, which keeps the voltage constant on the rest of the path of brush 69 where wind speeds are higher than necessary for capacity of the generator. This way, the turbine can work with much stronger winds, without need to be stopped. With wind speed over this limit, pitch-control system will farther increase pitch-angle of blades, lowering incidence-angle and lift coefficient, so that power of the turbine will be kept constant. Exact regulation of turbine power for all wind speeds can be constructively made by adequate distribution of density of resistance wire coiling [winding] along the length of rheostats 64 and 65.

Gear drive levels will be changed to change turbine speed from lower to higher speed at wind speed of about 7 meters per second. Pitch-control system follows wind speed fluctuations, and at 7 meters per second screw-nut 21 will pass by switch 75 which will actuate switch 73 to change gear drives from first to second gear level. Oil-pump motor 62 of first gear level will be disconnected, and the switch on means for freewheel 60 will be connected to power from load-control rheostat 65.

In the preferred embodiment, means for freewheel 60, which is shown separately in FIG. 13, comprises a horseshoe magnet on a lever, disposed near the surface of disk 57, and turned so that disk 57 is within the magnetic field. Its switch is ON pulled by a spring when disk 57 is stopped, and also ON pulled by disk 57 when it is rotating in the same direction as gear axle 52. But, it is pulled OFF when the disk is rotating in the opposite direction. Its purpose will be explained.

Whenever gear-drive level for lower turbine speed is working, and disk 56 is stopped by brakes, then second-level gear disk 57 must free rotate in opposite direction. Thus, by switching motor 62 off, and motor 63 via switch of means for freewheel 60 on, this switch will be in OFF position as long as gear disk 57 is rotating in opposite direction. Both brake systems will be out of power, and both gear-levels will be uncoupled. The turbine will run freely, using wind power only for its own acceleration, so that it will very quickly reach its second turbine speed.

As the gear axle 52 stays coupled to the generator, rotating at its constant speed, acceleration of the turbine will cause acceleration of the first-level disk 56, and slowing down of second-level disk 57. When the turbine reaches its second speed, disk 57 will be stopped, the switch on means for freewheel 60 will be turned ON, and motor 63 will drive oil-pump to actuate brakes 59 to hold the stopped second-level disk 57.

This way, gears will be changed from first to second turbine-speed without any friction, and without costly synchronization, and the generator will be out of torque for just a brief moment.

By this gear change also the other pole of switch 73 is turned, so that power from DC power source 74 will be switched from longer resistor 77 to shorter resistor 78. That will increase voltage in pitch-control rheostat 64, and that will switch motor 70 on, to drive screw-nut 21 back, to decrease pitch-angle of blades according to new speed ratio.

As the blade-to-wind speed ratio before this gear change was 22:7=3.14, and gear-change ratio is 41:22=1.86, the new speed ratio will be 3.14×1.86=5.84 or about 6, i.e. blades will be running 6 times faster than the wind. In order to avoid too often change of gears, the reverse change, from second to first turbine speed, will occur not before wind speed falls so that speed ratio is again about 7. That will satisfy the condition stated before, that the turbine runns in the favorable speed ratio between 3 and 7 [corresponding to tip speed ratio 5 to 10 by horizontal-axis wind turbines].

By the reverse change of gears, from second to first turbine speed, there will be no interruption in power supply to the grid. When by falling wind, the screw-nut 21 activates micro-switch 76, switch 73 is actuated to disconnect motor 63 and to connect oil-pump motor 62. That will loosen the second-level gear drive to run free, and actuate brakes of the first-level gear drive to slow down its disk 56. Because at the same wind speed first-level gear drive requires higher oil pressure, brakes will not hold disk 56, and it will start to slide. In the same time, on the other pole of switch 73 shorter resistor 78 will be disconnected, and larger resistor 77 will be connected, and so decreased voltage in pitch-control rheostat 64 will cause motor 70 to increase pitch-angle of blades by moving nut 21. That will also increase voltage in collector wire of load-control rheostat 65, which is feeding brakes. Consequently, the turbine will be slowed down first because of larger pitch-angle of blades, and secondly because of higher oil-pressure in brakes, which will stop rotation of disk 56, and the change of gears will be accomplished.

During turbine slowing down to first turbine speed, the surplus of kinetic energy of the rotor will be converted into heat in the brakes, but there will be no interruption or loss of power in the generator. After turning gear-levels from second to first turbine-speed, at wind speed of about 6 meters per second, this automatic mechanism will not engage it back to second speed until wind speed rises again to 7 meters per second. This again, to prevent frequent changes of gear drives.

Tower Construction

FIG. 2, presents a general view of preferred embodiment of wind turbine according to the present invention, the rotor of this turbine is mounted on a three-legged tower. Top portions of all leg members 1 are connected together to a means for housing turbine shaft 3, preferably a nacelle 2 comprising the generator with gears and electrical components. Bottom portions of leg members 1 are separated and anchored to their footings on the ground.

Each leg member 1 is made of lattice construction comprising longitudinal beams which are preferably made of pipes 88, traverses 90, and tightening diagonal rods 91, shown in FIGS. 16-A and 16-E.

To make the assembly easier and in less time, all connections of those parts are made with threaded fittings and threaded sleeves, beams are made by connecting pipes 88 in alignment by sleeves 89 as screw-nuts, sleeves have welded-on plates provided with holes for connection with traverses 90 by screws [not shown]. End portions of each traverse 90 are provided with welded-on angle irons with holes and diagonal rods 91 having threaded ends for easy fastening. FIG. 17-B.

Bottom end of each leg extends to one point at its footing 85, and is attached to be linked to its anchoring means [not shown]. For that purpose, the bottom end portions of pipes 88 on the bottom leg segment are provided with longer screw-thread and with ring formed screw-nuts 93 for fastening all pipe ends together to pipe-junction 92. This pipe-junction is made of pipe-sleeves without thread, which sleeves are welded together to a kernel-butt provided with an eye [as it is shown in FIG. 17-F] for pivotal connection to corresponding eyes on anchoring means [not shown] on footing 85. Those eyes for linking leg ends to the ground, as a means for pivotal linkage, are necessary for holding bottom ends of first two leg members on the ground while the assembled portion of the turbine is erected from its previous horizontal position.

Walls of nacelle 2, as means for housing of turbine shaft, are made preferably also of lattice construction, as framework covered by light panels. Top ends of longitudinal beams 88 of leg members 1 are fastened to frame junctions nacelle 2, so that frame beams are continuations of leg beams and are converging to cases of bearings of turbine shaft 3.

The third leg member 1 is fastened to nacelle 2 at two upper points by means of pivotal linkage 86, and in two lower points by adjustable fastening means 87. Those means are needed to establish location for the third leg of assembled portion while assembling it by adding its segments consecutively one section at a time. Each means for pivotal linkage 86 can be made of a pipe-sleeve provided with inner screw-thread and with welded-on eye, and a bolt for linking it with other two eyes welded to a frame junction on nacelle 2. Those two pivotal links 86 must be installed with a line parallel to the line of bottom ends of first two leg members, to assure correct location of the third leg member while its assembly is in progress.

The adjustable fastening means 87, at two lower points of connection to nacelle, can be made [preferably], with hydraulics or by other suitable process.

For this three-legged tower, as shown in FIGS. 16-A to 16-G, the nacelle 2 with the generator and all associated equipment is to be assembled first, including turbine shaft 3 and hub platforms 4 and 5, while at horizontal position on the ground. The completed tail structure on tail support means is mounted to the hub platform 5 also in horizontal position on the ground. This structure has to be lifted from horizontal position as in FIG. 16-A to a tilted position as in FIG. 16-B, for an angle which in final erected position will be between the plane of two leg members and the vertical. With nacelle 2 in this position, the first two leg members have to be fastened to nacelle 2 on the ground, and pipe-junction 92 on bottom ends of those leg members, as means for pivotal linkage, have to be linked to anchoring means [not shown] in footings 85.

The assembled composite structure, comprising two leg members and nacelle 2 with complete tail structure, has to be lifted from the ground on the side of nacelle, for space needed for first segment 1-A of third leg member. This first segment is fastened to nacelle 2, as already explained, by means for pivotal linkage 86 and by adjustable fastening means 87.

All other segments of third leg member, which except the last one are made preferably as in FIG. 17-A, are assembled on the site in the procedure of building the third leg. That will be done in the way that pipes 88 are screwed into sleeves 89 of the previous segment. Other sleeves 89 are screwed to end portions of those pipes 88; traverses 90 are fastened to those newly mounted sleeves by screws [not shown], and tightening rods 91 are installed with angle irons at end portions of each traverse 90.

When the crane hook is to be removed from nacelle 2, auxiliary footings 95 which are made of a piece of pipe 88 and a plate as shown in FIG. 17-A, are screwed into last mounted sleeves 89. The assembled portion of the turbine is placed to rest temporarily on those auxiliary footings on the ground, while the crane hook is provided with a load distributor [not labeled] and with jaw-hooks 94 shown in FIGS. 17-A, 17-C, 17-D and 17-E.

Each of those jaw-hooks 94 is made in form of a cylinder made as two pipes one inside the other, so outer pipe fits around sleeve 89, and two short pieces of an inner pipe fit around pipes 88. That cylinder is cut vertically in two halves which are hinged together along one vertical cut, and it is provided with a screw-lock on the opposite cut, to secure a strong grip around sleeve 89. On the side of the screw-lock, the middle portion of this cylinder is cut out to make space for end portions of traverses 90 and tightening rods 91 with their screw-nuts. On the side of the hinge joint, each half of this cylinder is provided with a welded-on hook with a chain link, which links are bound together by a chain or cable linked to the crane hook or to its load distributor. Inner diameter of lower portion of this hook 94 is a little larger than pipes 88, so that next pipe 88 can be screwed into sleeve 89 through closed hook 94.

While the assembled portion of the turbine is resting temporarily with auxiliary footings 95 on the ground, hooks 94 are clasped around sleeves 89 on bottom portion of the last mounted leg segment, and secured by the screw-lock. Then the assembled structure is lifted for the next leg segment, and auxiliary footings 95 are removed from sleeves 89 to make space for next pipes 88.

When nacelle 2 is lifted enough for struts 6 with blades 7 to be mounted to hub platforms 4 and 5, the assembled structure is also put down to rest on auxiliary footings 95, while the crane is engaged in lifting struts 6 with blades 7 to the hub.

The last segment of the third leg, the bottom one, consists of pipes 88 and pipe-junction 92, which has to be linked to the anchoring means on the footing 85.

As bottom ends of leg members 1 are spread apart, each leg member 1 is anchored to its separate footing, and those footings do not need to be any heavier than maximum stress in a leg member. As actual stress in a spread leg is much lower than stress in a compact tower, so those separate footings can be very much lighter and less costly than usual central footing of a wind turbine.

Besides, there is no need to wait for the concrete in those footings to harden, because the same time can be used to separately assemble first two leg members 1 and nacelle 2 with complete tail structure. Thereby three separate groups of assemblers can be engaged in the same time, so that the whole job can be done much faster. Except for fastening struts 6 to hub platforms 4 and 5, all other work on assembly on this wind turbine can be done on or very near the ground level.

The described preferred embodiment of this wind turbine can be accomplished in many other variations. It concerns not only size of the turbine, speeds, ratios, and other data, which are presented only as an example and to illustrate several important functions and interactions. It also concerns constructional solutions. For example, hub does not need to have two platforms to hold struts. There can be only one platform, and a strut can be made of only two longitudinal beams, if each strut is also fastened to a cable linking other end of the strut to the apex of the pyramidal support structure at the upper bearing of the tail-axle. The turbine can comprise two, three, or more blades and struts on adequate hub platform. Provided with described pitch-control system, the turbine can use described variably cambered blades with or without interpolated blade parts, or even simple compact blades without ailerons, when blades need to be of very low cost although will be less effective.

As the purpose of this invention was to achieve the best possible benefit-to-cost ratio, this wind turbine should preferably comprise all described and claimed improvements In addition, the blades can be also provided with light perpendicular tip plates, for prevention of tip vortices, which can farther improve efficiency of blades.

All changes, modifications, variations, and other uses and applications which do not depart from spirit and scope of this invention are deemed to be covered by the invention which is limited only by claims which follow.

I claim:

1. A large vertical-axis variable-pitch wind turbine, comprising a tower structure, a vertical turbine shaft supported by said tower structure, a hub structure affixed on said turbine shaft and carrying radially disposed horizontal struts, vertical blades pivotally attached to said horizontal struts, and a tail structure with a vane and a system for cyclical change of blade pitch-angle at each turbine turn, wherein the improvement comprises:

a support means for said tail structure which support means is mounted on said hub structure;

a tail-axle held in bearings by said support means and positioned above of and co-axial with said vertical turbine shaft, and carrying said tail structure;

a steering mechanism in a case affixed to lower end portion of said tail-axle in the space above said hub structure, for driving a steering pivot to various positions differently eccentric to said turbine shaft along a line generally parallel with the wind direction;

said steering pivot carrying a rotatably mounted hub for fastening a plurality of connecting means; and said connecting means between said steering pivot and each turbine blade, for blade pitch-angle control;

whereby magnitude of cyclical variation of blade pitch-angle is dependent on eccentricity of said steering pivot position, controled by said steering mechanism, so that it varies at any significant change of actual wind speed, to hold the wind-to-blade incidence angle to achieve highest possible efficiency.

2. The wind turbine defined in claim 1, wherein said steering mechanism in said case comprises:

a reversible motor with adequate transmission, for driving a long male screw;

said long male screw rotatably mounted in bearings housed in end walls of said case and driven by said reversible motor; and a screw nut carried by and matched to said long male screw, said screw nut having a downward projected extension carrying said steering pivot projected out of said case through a slot cut in bottom wall of said case;

whereby said screw nut carrying said steering pivot travels along said long male screw varying the eccentricity of the steering pivot position, when said long male screw is driven by said reversible motor, and whereby said reversible motor is engaged to drive said long male screw to move said screw nut to change the eccentricity of said steering pivot connected to trailing portions of said vertical blades to change the pitch-angle of said vertical blades to correct the wind-to-blade incidence angle, whenever actual wind speed is significantly changed.

3. The wind turbine defined in claim 2, further including a two-speed gear train of sun-and-planet type comprising:

an axle coupled to the turbine rotor;

a gear axle coupled to an electric power generator;

two gear drives of sun-and-planet type disposed co-axially in two parallel levels, each one of said gear drives comprising a sun gear, a plurality of planet gears, a ring gear, a gear case, a disk, and at least one means for preventing rotation; and a means for power transfer with two sets of journals disposed in said two parallel levels for carrying said planet gears;

wherein one of said gear cases is mounted on bearings to rotate on said axle coupled to the turbine rotor; the other one of said gear cases is mounted on bearings to rotate on said gear axle coupled to the generator; said means for power transfer is affixed to the end portion of said axle coupled to the turbine rotor therewith, said plurality of planet gears of both said gear drives are mounted to rotate on journals affixed to said means for power transfer, and each of said plurality of planet gears of one level are meshed with one of said sun gears and with one of said ring gears of the same level; both said sun gears are mounted on an end portion of said gear axle coupled to the generator to rotate therewith; each of said ring gears is formed on an inner surface of the gear case of the same gear drive; each of said disks is affixed to an outer surface of the gear case of the same gear drive; and each one of said means for preventing rotation is connected to stationary structure and situated to act on the one of said disks of the same gear drive;

whereby the system of said disks and said means for preventing rotation functions: as a clutch disconnecting the generator from the turbine rotor when all said means for preventing rotation are out of action on both said disks as a brake blocking the whole system when said means for preventing rotation are actually preventing rotation of both said disks, and as a mechanism for changing gears when said means for preventing rotation are acting on only one of said disks.

4. The wind turbine defined in claim 3, wherein:

said means for power transfer is a two-level yoke comprising an upper-level yoke shaped as a star-like plate carrying journals for the upper-level planet gear, which journals are extended into bolts holding the level yoke shaped as a ring carrying journals for the planet gears; and said means for preventing rotation are hydraulic brakes, wherein each plurality of this brakes acting on one of said disks is controlled by an electric oil pump motor.

5. The wind turbine defined in claim 3, further including a system of automatic control of wind-speed dependent blade pitch-angle, change of gear speeds, and protection against gusts and overload, comprising:

a wind tachometer, disposed on the top portion of said tail structure, for providing DC voltage corresponding with actual wind speed;

a DC power source, providing a control voltage;

a means, connected to said DC power source, for providing voltage dependant on actual blade pitch-angle;

a means for comparing voltages coming from said wind tachometer and from said means for providing voltage dependent on actual pitch-angle, for actuating said reversible motor controlling the pitch-angle whenever those voltages are sufficiently different;

a means, connected between said wind tachometer and said means for comparing voltages, for setting the pitch-angle of said blades to a position favorable for easy start of the wind turbine when there is no wind;

a means, connected to said steering mechanism and to said DC power source, for changing gear speed ratios in dependence of blade pitch-angle, and for regulating power of said means for preventing rotation according to actual power of the wind turbine; and a means, connected to said means for providing voltage dependent on actual blade pitch-angle, comprising thermostats and ammeters, for protecting the generator against overloading and overheating, by adequate variation of blade pitch-angle;

whereby said reversible motor is to regulate the blade pitch-angle at any significant change of wind speed, for optimal efficiency of the blades;

whereby gear speed ratio is automatically changing when necessary to keep the blades to run at favorable blade-to-wind speed ratio; and whereby the blade pitch-angle is automatically increased to lower efficiency of the blades and to lower the torque of the turbine before the generator is overheated or overloaded.

6. The wind turbine defined in claim 1, wherein said steering mechanism in said case comprises a hydraulic device for moving said steering pivot.

7. The wind turbine defined in claim 1, wherein each of said vertical turbine blades is an articulate airfoil comprising:
- a blade main body;
- an aileron which is pivotally linked to said blade main body in the way that possible deviation of said aileron to each side of the main body is limited to the angle where the airfoil made of the blade at maximal deviation of the aileron has the best lift-to-drag ratio; and
- a means for deviation control of said aileron, mounted to said aileron and connected to said blade holding horizontal strut;
- whereby said aileron is deviated to a preset limit to form an airfoil for the best lift-to-drag ratio whenever the pitch-angle of said blade main body is larger then the angle of said preset limit of deviation, and
- whereby said aileron is staying parallel with the tangent to its circular path whenever the pitch-angle of said blade main body is lower or equal to the angle of said preset limit of deviation of said aileron.

8. The wind turbine defined in claim 7, wherein said means for deviation control comprises:
- a short hinge-arm affixed to a plate attached to said aileron;
- a long hinge-arm having its one end portion pivotally linked to said short hinge-arm and having its other end portion pivotally linked to a distance-rod;
- said distance-rod positioned generally parallel to the blade cord and also pivotally linked to said horizontal strut, for keeping said long hinge-arm generally parallel to said horizontal strut;
- a covering means shaped to cover said short hinge-arm and its pivotal link to said long hinge-arm, which covering means is pressed by a coil-spring to the margins of said plate of said short hinge-arm attached to said aileron; and
- said coil-spring situated on and along said long hinge-arm and pressed between said covering means and the pivotal link of said long hinge-arm to said distance-rod;
- whereby said covering means is pressed by said coil-spring to just one side-margin of said plate attached to said aileron, holding said aileron deviated to said preset limit to form an airfoil for the best lift-to-drag ratio whenever the pitch-angle of said blade main body is larger then the angle of said limit of aileron deviation, and
- whereby said covering means is pressed to both side-margins of said plate attached to said aileron, holding said aileron to stay parallel with the tangent to its circular path whenever the pitch-angle of said blade main body is lower or equal to the angle of said limit of deviation of said aileron.

9. The wind turbine defined in claim 8, wherein the pivotal link of said aileron to said blade main body, which link is made to limit the deviation of said aileron to the angle making an airfoil for the best lift-to-drag ratio, further comprises:
- two secondary pivots, by one on each arm of said pivotal link, disposed equidistant to the main pivot of said pivotal link;
- said arms of said pivotal link being dilated in form of circular segments around and concentric with said secondary pivots;
- a grease-box comprising two half-shells and an inserted part consisting of two halves, for covering and encasing of said pivotal link including said dilatations of arms around said secondary pivots, for splitting the aileron deviation angle in two and for holding interpolated blade parts;
- said two half-shells, wherein a middle portion of said half-shells comprises a space for central portion of said pivotal link which space correspond to said limit of aileron deviation, wherein the portion of said half-shells around one of said secondary pivots is provided with openings for the ends of said secondary pivot and with concave inner walls for sliding contact with said arm, and
- wherein the portion of said half-shells around the other one of said secondary pivots includes space with straight parallel walls for sliding contact with said inserted part;
- said inserted part consisting of two halves, disposed inside of said grease-box and around the other one of said secondary pivots, having openings for the ends of this other secondary pivot, and provided with straight and parallel outher walls for slidable contact with said semi-shells, and concave inner walls for contact with the broadening of respective arm around of the secondary pivot; and
- said interpolated blade parts which are inserted between said blade main body and said aileron, each one of said interpolated blade parts fastened to and between each neighboring two of said grease-boxes, and shaped to follow the outline of the blade-and-aileron airfoil, and to fit for minimum of friction between said blade main body and said aileron;
- whereby said interpolated blade parts split the deviation-angle of said aileron in two, improving the air flow around so formed blade configuration by deviated aileron, and
- whereby said grease-box is containing lubricant so that all the moving parts of this pivotal link are lubricated for life.

10. The wind turbine defined in claim 1, further including a three-legged turbine tower comprising:
- a means for housing the turbine shaft;
- three leg members for supporting said means for housing the turbine shaft, wherein at least one of said leg members is formed of a plurality of segments connectable end-to-end in aligned relationship;
- three ground footings, each supporting one of said leg members;
- three anchoring means, linking said leg members to said ground footings;
- at least one pivotal linkage for linking the top one of said segments of one of said leg members to said means for housing the turbine shaft; and
- at least one adjustable fastening means of variable length for consecutive adjustment of the angle between said means for housing the turbine shaft and the top segment of said leg member formed of a plurality of segments, in the process of assembling said leg member formed of a plurality of segments;
- whereby this combination of said elements of the turbine tower enables assembly of two of said leg members together with said means for housing the turbine shaft, said hub structure, said tail structure and at least two of said struts with said blades in prevailingly horizontal position on the ground and erection of so assembled portion of the wind turbine in the process of assembling the third leg member, which is formed of plurality of segments, by lifting the assembled portion of the wind turbine consecutively each time for the length of the one of said segments which is to be linked to the previous one at a time.

* * * * *